(12) United States Patent
Van Taunay

(10) Patent No.: US 10,006,990 B2
(45) Date of Patent: Jun. 26, 2018

(54) METHOD, SYSTEM AND COMPUTER PROGRAM FOR DETERMINING DISTANCES AND POSITIONS

(71) Applicant: Gerald Jules Rudolf Van Taunay, Hoorn (NL)

(72) Inventor: Gerald Jules Rudolf Van Taunay, Hoorn (NL)

( * ) Notice: Subject to any disclaimer, the term of this patent is extended or adjusted under 35 U.S.C. 154(b) by 727 days.

(21) Appl. No.: 14/396,453

(22) PCT Filed: Apr. 23, 2013

(86) PCT No.: PCT/NL2013/050304
§ 371 (c)(1),
(2) Date: Oct. 23, 2014

(87) PCT Pub. No.: WO2013/162361
PCT Pub. Date: Oct. 31, 2013

(65) Prior Publication Data
US 2015/0153443 A1    Jun. 4, 2015

(30) Foreign Application Priority Data

Apr. 23, 2012  (NL) ...................................... 2008683

(51) Int. Cl.
| | | |
|---|---|---|
| *G01S 11/06* | (2006.01) | |
| *G01S 5/14* | (2006.01) | |
| *G01S 11/02* | (2010.01) | |
| *G01S 1/04* | (2006.01) | |
| *G01S 11/12* | (2006.01) | |
| *G01S 11/14* | (2006.01) | |

(52) U.S. Cl.
CPC ............... *G01S 11/06* (2013.01); *G01S 1/042* (2013.01); *G01S 5/14* (2013.01); *G01S 11/02* (2013.01); *G01S 11/12* (2013.01); *G01S 11/14* (2013.01)

(58) Field of Classification Search
CPC ..... H04Q 2209/47; G01S 11/06; G01S 1/042; G01S 5/14; G01S 11/02; G01S 11/12; G01S 11/14; G01S 5/02
See application file for complete search history.

(56) References Cited

U.S. PATENT DOCUMENTS

| | | |
|---|---|---|
| 2007/0247367 A1 | 10/2007 | Anjum et al. |
| 2009/0251313 A1 | 10/2009 | Perkins et al. |

(Continued)

*Primary Examiner* — Kyle R Quigley
(74) *Attorney, Agent, or Firm* — Browdy and Neimark, PLLC

(57) ABSTRACT

In a method and system, a distance between at least one first positioning device, FPD, and an second positioning device, SPD, is determined. At the FPD, a plurality of positioning signals are broadcast, wherein each positioning signal has a predetermined different broadcast power. At the FPD, a plurality of distance indication data signals is broadcast. Each distance indication data signal carries predetermined distance indication data associated with a distance range of a corresponding positioning signal at the predetermined broadcast power. At the SPD, the distance indication data are extracted from each distance indication data signal corresponding to a received positioning signal. At the SPD, a distance between the FPD and the SPD is determined from the distance indication data indicating the smallest distance range among the distance indication data received from the FPD.

48 Claims, 16 Drawing Sheets

(56) References Cited

U.S. PATENT DOCUMENTS

| | | | |
|---|---|---|---|
| 2009/0303005 A1* | 12/2009 | Tuttle | H04Q 9/00 340/10.1 |
| 2010/0045436 A1* | 2/2010 | Rinkes | H04Q 9/00 340/10.1 |
| 2011/0028162 A1* | 2/2011 | Hazzani | G01S 5/021 455/456.1 |
| 2011/0109436 A1* | 5/2011 | Milne | G06F 1/1694 340/8.1 |
| 2011/0156870 A1* | 6/2011 | Attew | G01S 5/14 340/10.1 |
| 2011/0170430 A1 | 7/2011 | Yang et al. | |
| 2013/0094422 A1* | 4/2013 | Thanikachalam | H04B 7/0691 370/312 |

* cited by examiner

| 50 | 51 | 52 | 53 | 54 | 55 | 56 | 57 | 58 | 59 | 60 | 61 | 62 | 63 |
|---|---|---|---|---|---|---|---|---|---|---|---|---|---|
| ID-number shopper | ID-number store | Date | Visiting-rate | Time of Arrival | Time spend in zones | Time spend at check-out point | Time of Departure | Total time of visit | Position data (walking-routes) in zones | Viewing direction in zones | Speed and weight measurements in zones | Read in bought products by check-out point | Transaction amount |
| | | | Day Week Month | | Zone 0 Zone 1 Zone ... | | | | | | m/s kg | | |
| 1 | | | | | | | | | | | | | |
| 2 | | | | | | | | | | | | | |
| 3 | | | | | | | | | | | | | |
| ... | | | | | | | | | | | | | |

↓ +

| 64 |
|---|
| Total consumers/shoppers at a point in time |

FIG. 15

METHOD, SYSTEM AND COMPUTER PROGRAM FOR DETERMINING DISTANCES AND POSITIONS

FIELD OF THE INVENTION

The invention relates to the field of determining distances between positioning devices, and determining positions of positioning devices associated with an object, person or animal, i.e. determining a location or position in one, two or three dimensions, where the location a priori is unknown due to the capability of the object, person or animal to move or be moved.

BACKGROUND OF THE INVENTION

Positioning systems wherein distances are measured, to be used in predetermined areas, are well-known. Generally, such systems need to be wireless, energy-efficient and cost-efficient, and need to have a low response time. A great diversity of existing indoor positioning systems may employ WLAN (wireless local area network), RSS (received signal strength), GPS (global positioning system), UWB (ultra wide band), TDOA (time difference of arrival), ultrasound, infrared, active RFID (radio frequency identification), Bluetooth®, QDMA (quad-division multiple access), and/or DECT (digital enhanced cordless telecommunications) technology and any other wireless techniques.

The existing methods and systems are complicated, may be expensive, and may require substantial energy to function. Furthermore, most methods and systems do not function real-time.

SUMMARY OF THE INVENTION

It would be desirable to provide an improved method and improved system which are simple to implement. It would also be desirable to provide a method and system which are low-cost. It would further be desirable to provide a method and system which require little energy to function properly. It would still further be desirable to provide a method and system which are configured to operate real-time.

To better address one or more of these concerns, in a first aspect of the invention a method of determining a distance between at least one first positioning device, FPD, and an second positioning device, SPD, is provided, the method comprising:

at the FPD, broadcasting a plurality of positioning signals, each positioning signal having a predetermined different broadcast power;

at the FPD, broadcasting a plurality of distance indication data signals, each distance indication data signal carrying predetermined distance indication data associated with a distance range of a corresponding positioning signal at the predetermined broadcast power;

at the SPD, extracting the distance indication data from each distance indication data signal corresponding to a received positioning signal, and determining a distance between the FPD and the SPD from the distance indication data indicating the smallest distance range among the distance indication data received from the FPD.

In all embodiments, the positioning signal and the distance indication data signal may be different signals or may be one signal functioning both as positioning signal and as distance indication data signal. In the latter case, the positioning signal carries the distance indication data. For example, the positioning signal could be mixed with the distance indication data signal, or the positioning signal could be modulated e.g. Pulse modulation, Amplitude modulation, Frequency modulation etc. with the distance indication data signal. Also e.g. the frequency and wavelength of the signal can be taken into account. At least one of the positioning signal and the distance indication data signal may be a radio signal, a light signal, a sound signal or a magnetic field signal. The distance indication data signal may be a modulated signal, where the modulation of the signal is representative of distance indication data contained in the signal. If the positioning signal is a radio signal, the broadcast power is a radio signal power of the positioning signal. If the positioning signal is a light signal, the broadcast power is a light intensity of the positioning signal. If the positioning signal is a sound signal, the broadcast power is a sound power of the positioning signal. If the positioning signal is a magnetic field signal, the broadcast power is a magnetic field power of the positioning signal or the strength of the magnetic field. The above mentioned signals can also be combined with each other. Also heat, smell/aromatic substance, vibration etc. are examples of signals that can be used for a positioning signal. The broadcast power can be the intensity of the heat, smell/aromatic substance or vibration.

In an embodiment, a method for determining a distance between each one of a plurality of FPDs and a SPD is provided, the method comprising:

at each FPD, broadcasting a plurality of positioning signals, each positioning signal having a predetermined different broadcast power;

at each FPD, broadcasting a plurality of distance indication data signals, each distance indication data signal carrying predetermined identification data identifying the FPD, and further carrying predetermined distance indication data associated with a distance range of a corresponding positioning signal at the predetermined broadcast power;

at the SPD, extracting the identification data and distance indication data from each distance indication data signal corresponding to a received positioning signal, and determining a distance between each FPD as identified by its identification data and the SPD from the distance indication data indicating the smallest distance range among the distance indication data received from the respective FPD.

In an embodiment, a method for determining a distance between at least one FPD and each one of a plurality of SPDs is provided, the method comprising:

at the FPD, broadcasting a plurality of positioning signals, each positioning signal having a predetermined different broadcast power;

at the FPD, broadcasting a plurality of distance indication data signals, each distance indication data signal carrying predetermined distance indication data associated with a distance range of a corresponding positioning signal at the predetermined broadcast power;

at each SPD, extracting the distance indication data from each distance indication data signal corresponding to a received positioning signal, and determining a distance between the FPD and each respective SPD from the distance indication data indicating the smallest distance range among the distance indication data received from the FPD.

In a second aspect of the present invention, a system of determining a distance between at least one first positioning device, FPD, and a second positioning device, SPD, is provided, wherein:

the FPD is configured to broadcast a plurality of positioning signals, each positioning signal having a predetermined different broadcast power;

the FPD is further configured to broadcast a plurality of distance indication data signals, each distance indication data signal carrying predetermined distance indication data associated with a distance range of a corresponding positioning signal at the predetermined broadcast power; and the SPD is configured to receive the distance indication data signals, and to extract the distance indication data from each distance indication data signal corresponding to a received positioning signal, and to determine a distance between the FPD and the SPD from the distance indication data indicating the smallest distance range among the distance indication data received from the FPD.

In an embodiment, a system for determining a distance between each one of a plurality of FPDs and a SPD is provided, wherein:

the FPD is configured to broadcast a plurality of positioning signals, each positioning signal having a predetermined different broadcast power;

the FPD further is configured to broadcast a plurality of distance indication data signals, each distance indication data signal carrying predetermined identification data identifying the FPD, and further carrying predetermined distance indication data associated with a distance range of a corresponding positioning signal at the predetermined broadcast power; and the SPD is configured to extract the identification data and distance indication data from each distance indication data signal corresponding to a received positioning signal, and to determine a distance between each FPD as identified by its identification data and the SPD from the distance indication data indicating the smallest distance range among the distance indication data received from the respective FPD.

In an embodiment, a system for determining a distance between at least one FPD and each one of a plurality of SPDs is provided, wherein:

the FPD is configured to broadcast a plurality of positioning signals, each positioning signal having a predetermined different broadcast power;

the FPD further is configured to broadcast a plurality of distance indication data signals, each distance indication data signal carrying predetermined distance indication data associated with a distance range of a corresponding positioning signal at the predetermined broadcast power; and each SPD is configured to extract the distance indication data from each distance indication data signal corresponding to a received positioning signal, and to determine a distance between the FPD and each respective SPD from the distance indication data indicating the smallest distance range among the distance indication data received from the FPD.

In the (embodiments of the) methods and systems, after having determined the distance or distances, a position of one or more first positioning devices and one or more second positioning devices relative to each other can be determined.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 15 illustrates a table/computer program to be used to collect and store data of moving people associated with a positioning device of the present invention.

DETAILED DESCRIPTION OF EMBODIMENTS

In this description, a distance between a positioning device and another positioning device may be determined in one dimension, i.e. along a line, or in two dimensions, i.e. in a plane, or in three dimensions, i.e. in a space. Similarly, a location or position of at least one positioning device relative to at least one other positioning device may be determined in one, two or three dimensions. A positioning device may be an object, may be part of an object, and/or may be connected or coupled to an object. The object may be fixed or movable along a line, in a plane, or in a space, respectively.

Figure 1:
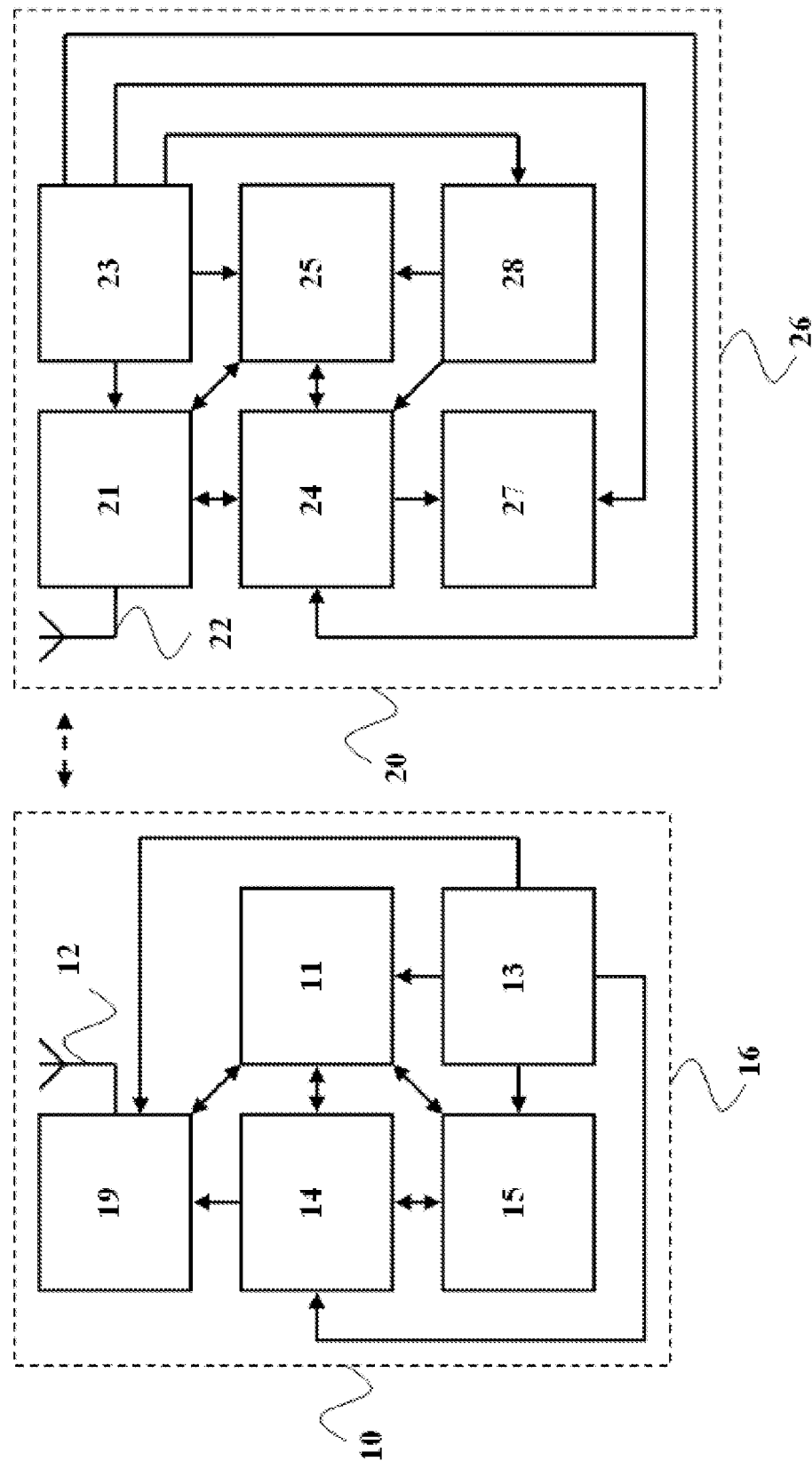
FIG. 1 depicts block diagrams of two positioning devices according to the present invention and component parts thereof.

FIG. 1 illustrates a first positioning device 10 comprising component parts such as a radio frequency, RF, transceiver (transmitter and receiver) 11, an antenna assembly 12, an energy source 13, a controller 14 (comprising a data processing unit), and a memory 15. Any combination of said component parts may be manufactured as an integrated unit, and may include a housing 16.

A second positioning device 20 comprises component parts such as an RF transceiver (transmitter and receiver) 21, an antenna assembly 22, an energy source 23, a controller 24 (comprising a data processing unit), and a memory 25. Any combination of said component parts may be manufactured as an integrated unit, and may include a housing 26.

In some embodiments, the first positioning device 10 and/or the second positioning device 20 comprises a sensing device and/or an interface device. The sensing device may e.g. comprise an accelerometer, a positioning device, a compass device, a gyroscope device, a magnetometer and/or other position or motion sensing devices. The sensing device may output a signal representing e.g. a (absolute) position, speed, acceleration, orientation, direction of movement of the first positioning device 10 and/or the second positioning device 20. For example, FIG. 1 shows the second positioning device 20 comprising an output device 27, such as a computer/PC interface, and a sensing device 28. The computer/PC interface may be used to transmit data to a computer, and to receive data from a computer. The computer may be used to process data acquired by the first positioning device 10 or the second positioning device 20. The output device 27 may further comprise a display, a loudspeaker, an audio output, or a pointing device indicating a direction.

One or more of the sensing devices may be used temporarily for determination of distance or position, when communication between the first positioning device and the second positioning device fails or is not available. The sensing devices may also be used to enhance the accuracy of the distance or position determination.

Each one of the energy sources 13 and 23 may comprise (part of) a mains power supply, a battery, a solar energy supply, or any other energy source. Each one of the antenna assemblies 12 and 22 may comprises one or more antennas.

In the first positioning device 10, the controller 14 controls the transceiver 11 powered by the energy source 13 to broadcast a plurality of positioning signals and/or distance indication data signals through the antenna assembly 12. The broadcast power of each positioning signal is predetermined, and controlled by the controller 14 based on values set in the memory 15, as will be explained in greater detail below. Each positioning signal broadcast by the first positioning device 10 may carry predetermined distance indication data as stored in the memory 15, and associated with the broadcast distance range of the positioning signal at the predetermined broadcast power. Alternatively, the distance indication data may be broadcast by the first positioning device 10 in a separate distance indication data signal corresponding to a specific positioning signal. In the following, it will be assumed that the positioning signal carries the distance indication data. Accordingly, a positioning signal having a broadcast power to have a broadcast distance range up to X meters may carry distance indication data indicating the X meters broadcast distance range. In some embodiments, each positioning signal broadcast by the first positioning device 10 further carries predetermined identification data identifying the first positioning device 10. The identification data may uniquely identify the first positioning device 10. In some embodiments, each positioning signal broadcast by the first positioning device 10 further carries position data identifying a position of the first positioning device 10 along a line, in a plane and/or in a space.

In the second positioning device 20, the controller 24 controls the transceiver 21 powered by the energy source 23 to receive positioning signals, such as the positioning signals broadcast by the first positioning device 10, through the antenna assembly 22. The controller 24 is configured to extract the distance indication data from the positioning signals broadcast by, and received from the first positioning device 10. In some embodiments, and when the positioning signals broadcast by the first positioning device 10 carry identification data, the controller 24 is further configured to extract the identification data from the positioning signals broadcast by, and received from the first positioning device 10. In some embodiments, and when the positioning signals broadcast by the first positioning device 10 carry position data, the controller 24 is further configured to extract the position data from the positioning signals broadcast by, and received from the first positioning device 10.

The plurality of positioning signals having different broadcast power may be broadcast sequentially, or substantially simultaneously. If distance indication data signals separate from positioning signals are broadcast, each distance indication data signal will be broadcast substantially synchronously with the corresponding positioning signal.

It is noted that in FIG. 1 the positioning signal and/or the distance indication data signal is a radio signal, transmitted and received through antenna assemblies 12, 22. In alternative embodiments, the positioning signal and the distance indication data signal may be a light signal, a sound signal or a magnetic field signal, where the antenna assemblies 12, 22 are replaced by light, sound or magnetic field emitting and receiving devices, and the transceivers 11 and 21 are configured to process the specific types of light, sound or magnetic field signals. If a positioning signal separate from a distance indication data signal is used, different types of the positioning signal and the distance indication signal may be used: the positioning signal may e.g. be a sound signal, whereas the corresponding distance indication data signal may be a radio signal. A delay between such different type signals may ensure that they are received at substantially the same time, despite their difference in propagation speed.

Figure 2:
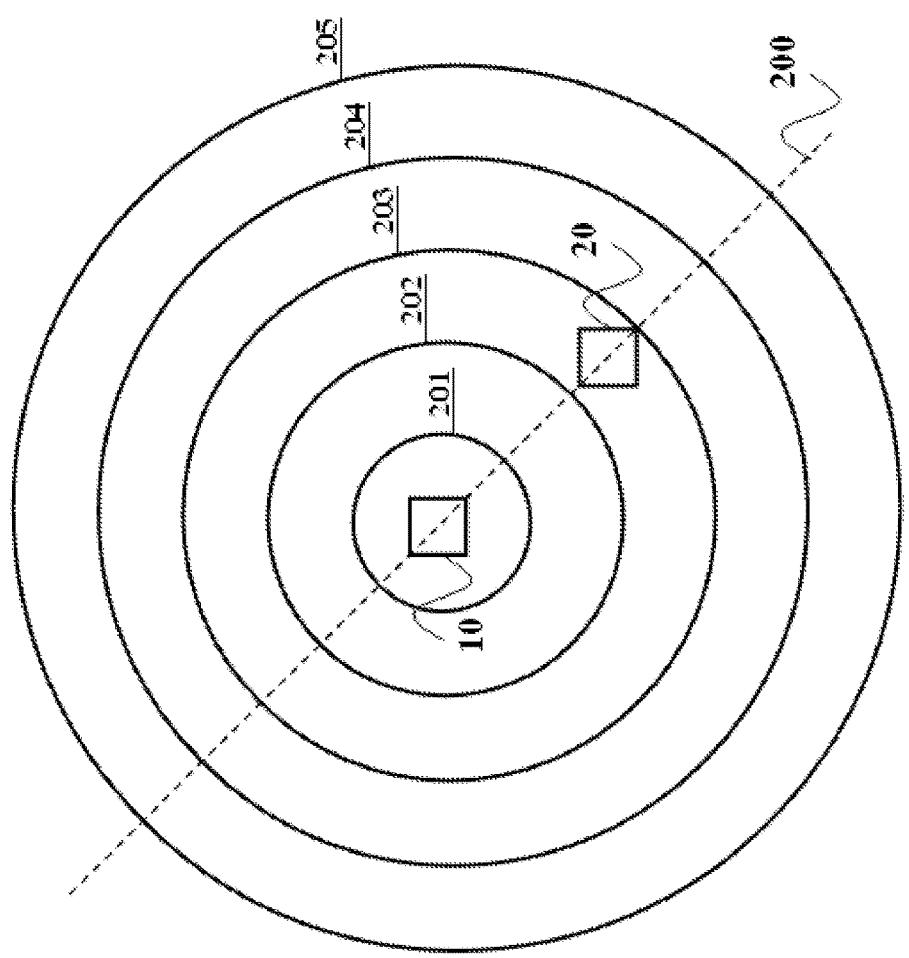
FIG. 2 is a schematic view illustrating a method of determining a distance between a first positioning device and a second positioning device according to the present invention.

FIG. 2 further illustrates an operation of the second positioning device 20. FIG. 2 shows a first positioning device 10 and a second positioning device 20 being at a distance from each other along a line 200.

The first positioning device 10 periodically broadcasts, either simultaneously or consecutively, positioning signals having different broadcast distance ranges. If all the position signals and distance indication data signals are sent simultaneous by a positioning device, the positioning device can use for example one or more transceivers with different kind of antennas. Each transceiver will then send a position signal and distance indication data signal that is assigned to a transceiver. The position signals and distance indication data signals may be sent simultaneous continues or with a time interval to preserve energy. Also the positioning signals having different broadcast distance ranges can be broadcast randomly or the positioning device can switch between different broadcast methods e.g. randomly, sequentially, simultaneously etc.

As explained above, each positioning signal contains distance indication data associated with the (physical) broadcast distance range of the positioning signal concerned. In FIG. 2, such ranges are illustrated (in a two-dimensional representation) as concentric circles 201, 202, 203, 204 and 205 around the first positioning device 10. Also more or less concentric circles or broadcast ranges can be used than given in the example.

The controller 14 of the first positioning device 10 may control the broadcast power such as to have the different broadcast distance ranges of the different positioning signals increase linearly as illustrated in FIG. 2. In other embodiments, instead of linearly increasing broadcast distance ranges, other sets of ranges may be selected through an appropriate configuration or programming of the controller 14 and memory 15.

In FIG. 2, the broadcast range 201 may be for example N meters (N>0), and the corresponding positioning signal carries distance indication data indicating such range of N meters. Broadcast ranges 202, 203, 204, 205 may be for example N+M meters (M>0), N+2M meters, N+3M meters, and N+4M meters, respectively, and the corresponding positioning signals carry distance indication data indicating such ranges. M and N are natural numbers.

The second positioning device 20 is located outside the broadcast ranges 201 and 202, and therefore will not receive the corresponding positioning signals. On the other hand, the second positioning device 20 will receive positioning signals having broadcast ranges 203, 204 and 205. Accordingly, the second positioning device 20, through its controller 24, extracts position indication data from the received positioning signals indicating distances of N+2M meters, N+3M meters and N+4M meters. The controller 24 is configured to select the position indication data associated with the smallest distance, in the illustrated embodiment N+2M meters, and to determine these data as representing the distance between the first positioning device 10 and the second positioning device 20.

As a result of the broadcast ranges 201, 202, 203, 204 and 205 being discrete ranges, when the second positioning device 20 detects position indication data indicating a distance N+2M meters, an actual distance D may be N+M<D≤N+2M meters in the shown example of linearly increasing broadcast ranges. It will be clear that such inaccuracy or error in the determination of the distance between the first positioning device 10 and the second positioning device 20 depends from the spatial resolution of the broadcast ranges.

Also a position and/or a distance can be determined on the border of switching between e.g. 202 and 203. By measuring this occurrence there can be determined when a position device enters or leaves a certain broadcast range. For example if the value, distance and/or position 203 signal is received constant by a positioning device, the positioning device knows in which concentric circle it is positioned. If the position of a positioning device is between the borders of 202 and 203 the positioning device will not receive a constant signal anymore. Instead of a constant signal the signal begins to switch between borders 202 and 203. If this occurrence is measured by a positioning device, it is possible to derive another position from the occurrence that is caused by switching between borders. This position will be positioned on the border of 202 and 203. The distance of the range of a concentric circle or broadcast range illustrated in FIG. 2 can be measured or calculated (type of antenna, output power, frequency etc.). Between switching borderlines there can be a distance e.g. 203 to 204. If for example the distance between 203 and 204 is 0.3 meter, it is possible to determine three values. Value one can be measured between switching borders from 202 to 203, value one can have for example a value of 0.9 meter. Value two can be measured if the received signal 203 is constant. The positioning device will be positioned in the area of 203. Value two can have an average value of e.g. 1.05 meter, the real value will be between for example 0.91 meter-1.19 meter. Value three can be measured between switching borders from 203 to 204, value three can have for example a value of 1.2 meter. With this method the system measures when it enters, leaves or remains in a concentric circle or broadcast range. In combination with sensors e.g. an accelerometer, a compass sensor and/or a gyroscope it is possible to calculate or measure the position between entering and leaving (value two 0.91 meter-1.19 meter) a concentric circle or broadcast range. With this method it is possible to collect more positions and/or distances of positioning devices. Also the position and/or distance can be determined by the received signal strength or the received signal strength indicator (RSSI). For example a positioning device measures the signal strength of each concentric circle or broadcast power and depending of the strength of the signal the positioning device determines a position and/or distance. The time differences between signals can also be measured. For example if a positioning device enters a concentric circle or broadcast range the positioning device starts a timer. The time between entering and entering a different border can be used to calculate an average time and this value can be used as a reference to determine a distance and/or position between borders. The methods to determine a position and/or distance may also be combined.

Figure 3:
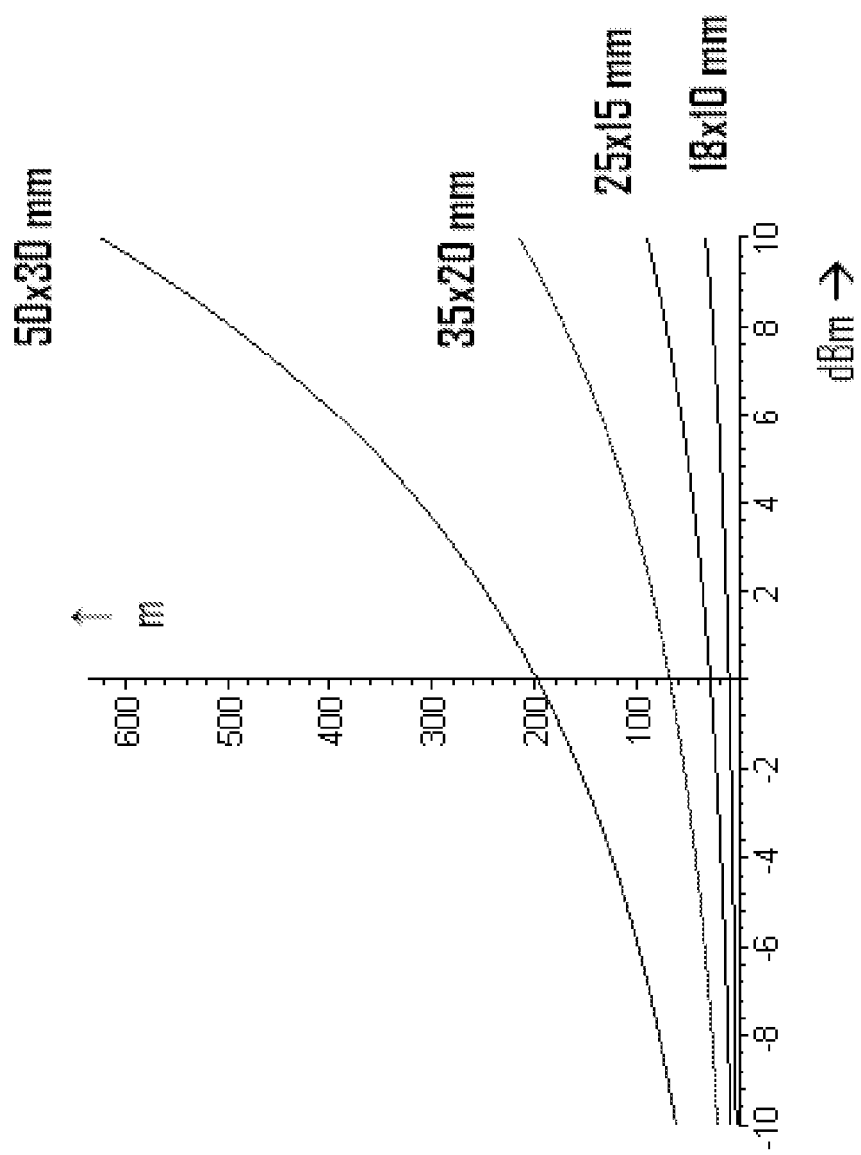
FIG. 3 depicts, for loop antennas, a relationship between broadcast power (horizontal axis) and broadcast range (vertical axis).

It is noted that the broadcast distance range of a transmitter/transceiver depends from the size and type of the antenna. At the same broadcast power, a small antenna will have a smaller broadcast distance range than a large antenna. This is depicted in FIG. 3 illustrating, for differently sized loop antennas, a relationship between broadcast power P (horizontal axis, dBm) and broadcast range R (vertical axis, meters) for loop antennas having different sizes (18×10 mm, 25×15 mm, 35×20 mm, and 50×30 mm), and transmitting in the 433 MHz frequency band. Thus, for covering a wide set of broadcast ranges, it is advantageous to use multiple antennas. As an example, a first positioning device 10 may use a 25×15 mm loop antenna to broadcast positioning signals having broadcast ranges between 30 and 80 meters, and use a 35×20 mm loop antenna to broadcast positioning signals having broadcast ranges between 80 and 200 meters. To enable an operation of the first positioning device 10 having an antenna assembly 12 comprising a plurality of antennas, the first positioning device 10 may comprise a switching device 19 controlled by the controller 14 to switch to the antenna to be used to broadcast (a) positioning signal(s) having (a) predetermined broadcast range(s).

Based on the graph shown in FIG. 3, as an example the following table I may be provided for a 35×20 mm loop antenna broadcasting positioning signals at different output powers, expressed in dBm, in the 433 MHz frequency band. It is noted that dBm (sometimes dBmW) is an abbreviation for the power ratio in decibels (dB) of the measured power referenced to one milliwatt (mW).

TABLE I

| Broadcast power (dBm) | Broadcast distance (m) | Distance indication data | First distance indication code (digital) | Second distance indication code (digital) |
|---|---|---|---|---|
| −10 | 20 | 0 | 0000 | 00010100 |
| −8 | 30 | 1 | 0001 | 00011110 |
| −6 | 40 | 2 | 0010 | 00101000 |
| −4 | 50 | 3 | 0011 | 00110010 |
| −2 | 60 | 4 | 0100 | 00111100 |
| 0 | 70 | 5 | 0101 | 01000110 |
| 2 | 80 | 6 | 0110 | 01010000 |
| 4 | 100 | 7 | 0111 | 01100100 |
| 6 | 140 | 8 | 1000 | 10001100 |
| 8 | 170 | 9 | 1001 | 10101010 |
| 10 | 220 | 10 | 1010 | 11011100 |

As illustrated in Table I, when the broadcast power of a 35×20 mm loop antenna is linearly increased from −10 dBm to +10 dBm in steps of 2 dBm, the broadcast distance range increases non-linearly from 20 m to 220 m.

Switching of antennas and/or switching to different kind of antennas may be performed such that the broadcast distance range increases according to a linear function in accordance with an linear increase in dBm broadcast power. For example, smaller type antennas may cover shorter broadcast ranges, while bigger type antennas cover larger broadcast ranges. Alternatively, or additionally, stepwise increases of broadcast power may vary to create a substantially linear course in broadcast distance range. Also, the frequency band of the broadcast signals may be varied to create a substantially linear course in broadcast distance range.

Each broadcast power may be identified by distance indication data, for example a first distance indication code (see Table I) indicating in consecutive digital numbers distance indication data from 0 to 10. When the first distance indication codes are broadcast from the first positioning device 10 in a plurality of positioning signals having the corresponding broadcast powers, a second positioning device 20 receiving the positioning signals may be configured to determine the lowest first distance indication code among a plurality of first distance indication codes received, but would not be able from the determined lowest first distance indication code as such what the actual distance between the first positioning device 10 and the second positioning device 20 is. For the determination of the actual distance, the second positioning device 20 would need information on the broadcast distance corresponding to each first distance indication code. Such information may be stored in the memory 25 of the second positioning device 20 as second distance indication codes. As an example, the second positioning device 20 receiving digital first distance indication codes being 1000, 1001 and 1010, and determining that the lowest value is 1000, can determine from second distance indication codes stored in combination with the first distance indication codes that the distance between the first positioning device 10 and the second positioning device 20 (in digital form) is 10001100, i.e. 140 m.

In another embodiment, each broadcast power may be identified in its corresponding positioning signal by the second distance indication code (see Table I) indicating the actual broadcast range of the positioning signal having the broadcast power. When the second distance indication codes are broadcast from the first positioning device 10 in a plurality of positioning signals having the corresponding broadcast powers, a second positioning device 20 receiving the positioning signals is able to determine the lowest second distance indication code among a plurality of second distance indication codes received, and therefrom directly knows what the actual distance between the first positioning device 10 and the second positioning device 20 is. No further information needs to be stored in the memory 25 of the second positioning device 20. As an example, the second positioning device 20 receiving digital second distance indication codes being 01010000, 01100100, 10001100, 10101010 and 11011100, and determining that the lowest value is 01010000, can determine from this code directly that the distance between the first positioning device 10 and the second positioning device 20 (in digital form) is 01010000, i.e. 80 m.

Figure 4:
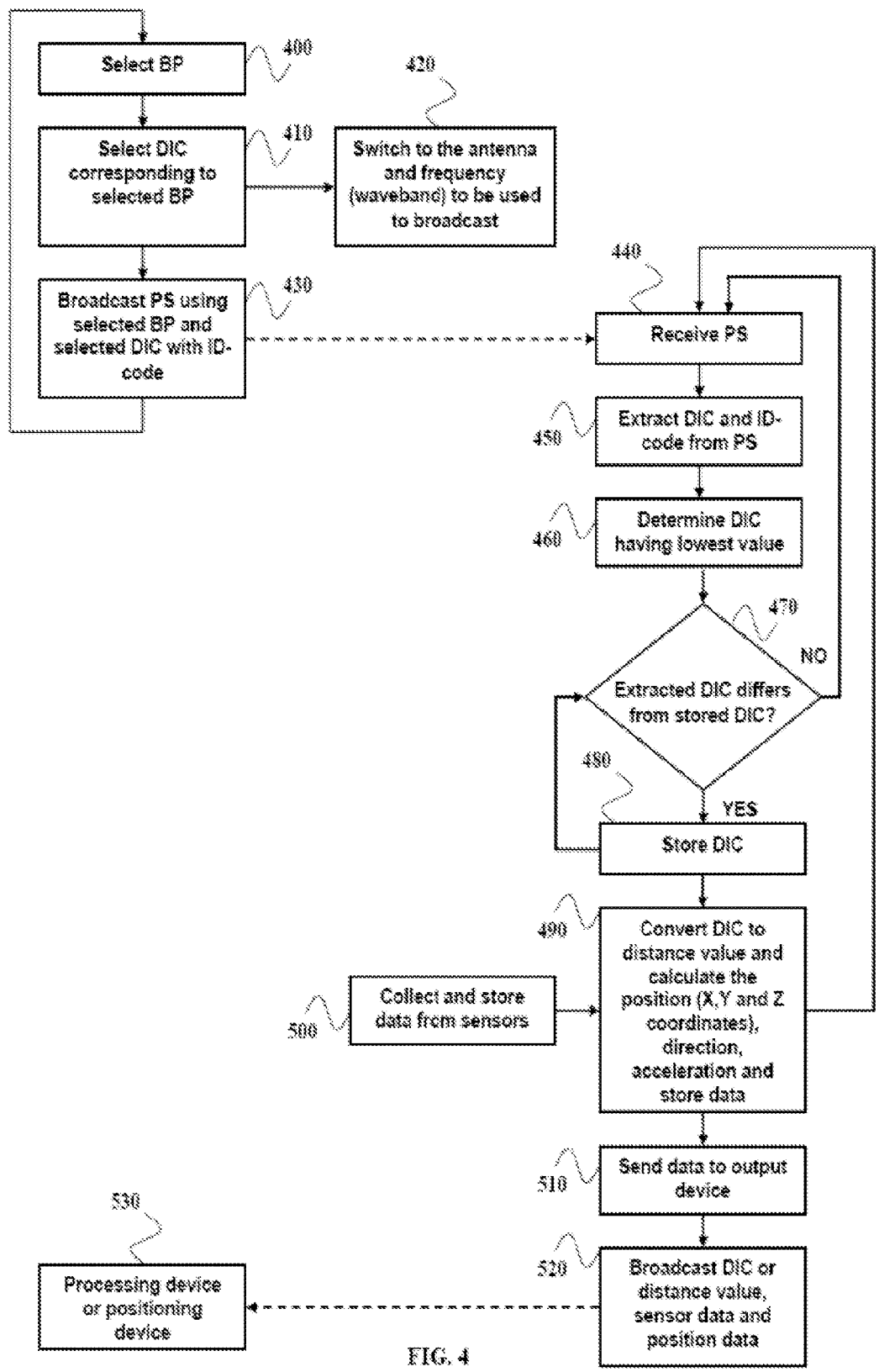
FIG. 4 depicts a flow diagram illustrating a process of determining a distance between a first positioning device and a second positioning device according to the present invention.

FIG. 4 illustrates a flow diagram of operations for a second positioning device 20 determining its distance relative to a first positioning device 10.

The first positioning device 10, at step 400, selects a broadcast power, BP, with which to broadcast a positioning signal, PS. At step 410, a distance indication code, DIC, is selected corresponding to the selected BP. It is noted that steps 400 and 410 can take place in reversed order, wherein first a DIC is selected, and next a BP corresponding to the selected DIC is selected. At step 420, the switching device 19 may be activated to switch to the antenna to be used to broadcast (a) positioning signal(s) having (a) predetermined broadcast range(s). Alternatively or additionally, a frequency (waveband) of a positioning signal may be adapted. In this case, before a change of frequency is made, a transmission is made to the second positioning device 20 to indicate the change of frequency, so that the second positioning device may tune to the correct frequency to receive the positioning signal. At step 430, the first positioning device 10 broadcasts a PS using the selected BP and including the selected DIC. At step 440, the second positioning device 20 receives the PS broadcast by the first positioning device 10. At step 450, the DIC is extracted from the received PS. At step 460, from a plurality of DICs, the DIC having the lowest value is determined. At step 470, which may be performed during a predetermined time period and/or for a predetermined number of times, the extracted DIC is compared with a DIC stored in a memory of the second positioning device 20. If the extracted DIC differs from a stored DIC, then at step 480 the DIC having the lowest value is stored. If the extracted DIC does not differ from a stored DIC, then the process continues at step 440. The stored DIC may directly indicate a distance value. If, on the other hand, this DIC is a code referring to a particular distance value, at step 490 the lowest value DIC is converted to a distance value. This distance value represents the distance between the first positioning device 10 and the second positioning device 20. If more then one positioning device 10 is used, the second positioning device 20 collects all the distance indication data signals of the different positioning devices 10 that are distinguished by an ID-code. If the lowest distance indication data value is determined of each first positioning device e.g. 10-1, 10-2, 10-3, ... and the positions and distances between each first positioning device e.g. 10-1, 10-2, 10-3, ... is known, the second positioning device 20 can calculate its position or coordinates (x, y and z). Further, in some embodiments, from the DIC a position may be determined, a direction may be determined, a speed may be determined, an acceleration may be determined, etc., taking into account previously stored DIC values and time. At step 500, data from sensors being coupled to the second positioning device may be collected and stored. The process continues at step 440 to receive further PSs. At step 510, data collected in previous steps may be send to an output device for further transfer to a user in a suitable form, or for further processing and/or storage. The output device may receive the data continuously, or may download the data at selected times.

Optionally, according to step 520, the DIC or distance value, and optionally other data such as sensor data and position data, is broadcast. This broadcast may include identification data to indicate the DIC or distance value to originate from a specific second positioning device 20. At step 530, a positioning device and/or a processing device may receive the broadcast from the second positioning device 20.

To save broadcast energy, in some embodiments a predetermined time delay is used in the process flow from step 430 to step 440. Accordingly, the PS may be broadcast less frequently. A side-effect occurring is that the distance may be updated less frequently, which may be suitable when the first positioning device 10 and the second positioning device 20 move relatively slowly relative to each other.

Further to save broadcast energy, in some embodiments a predetermined small number of BP changes may be used. A side-effect occurring is that the distance may be determined less accurately which may be suitable in some applications.

Both methods to save broadcast energy may also be combined.

In some embodiments, the second positioning device 20 is configured to broadcast the determined DIC or distance value such that a first positioning device 10 will receive it, i.e. with sufficient broadcast power for the first positioning device 10 to receive it. In some embodiments, the (controller 24 of the) second positioning device 20 is configured to broadcast the determined DIC or distance value only when it has changed, to save energy. In embodiments comprising more than one second positioning device 20, each second positioning device 20 is configured to broadcast the determined distance value in combination with identification data identifying the specific second positioning device 20. In embodiments comprising more than one first positioning device 10 and more than one second positioning device 20, each second positioning device 20 is configured to broadcast the determined DIC or distance value in combination with identification data identifying not only the specific second positioning device 20, but also the first identification device 10 which originally broadcast the positioning signals to base the determined DIC or distance value on. This will enable the first positioning device 10 to identify a received DIC or distance value as originating from a particular second positioning device 20.

In a determination of distance between a first positioning device 10 and a second positioning device 20 it would be sufficient to know, at the second positioning device 20, the position of the second positioning device 20 relative to the first positioning device 10 if the second positioning device 20 would be moving along a predetermined line 200 and in a predetermined direction. In such a one-dimensional situation, a distance corresponds to a position. However, in multi-dimensional situations, a plurality of first positioning devices 10 each broadcasting positioning signals of different broadcast powers may be required. Then, each of the first positioning devices 10 may broadcast its positioning signals comprising identification data identifying the specific first positioning device 10, such as to enable the second positioning device 20 to determine distances between the second positioning device 20 and each one of the first positioning devices 10 as identified by its unique identification data. If the memory 25 of the second positioning device 20 stores the positions of each one of the first positioning devices 10, the controller 24 of the second positioning device 20 may be configured to determine its position based on the known positions of the first positioning devices 10 and the distances from the second positioning device 20 to each one of the first positioning devices 10 as determined from the positioning signals and identification data received.

Referring to FIG. 1, the second positioning device 20 may comprise at least one output device 27 to output information relating to its position to a user of the second positioning device 20 or to a computer interface to send data to a computer system for further processing and/or storage. The output device may comprise at least one of a display, such as a liquid crystal display (LCD) or a touch screen, a loudspeaker, or a light source to indicate a position. In case of a display/touch screen, a position may be displayed on a map in a two-dimensional or three-dimensional view. In case of a loudspeaker, a position may be indicated e.g. by reference to a space in a building. In case of a light source, a position may be indicated e.g. by a light color, or a light intensity, or a light signal.

If a first positioning device 10 does not only broadcast positioning signals, but is also configured to receive other positioning signals broadcast from other first positioning devices 10 through a transceiver thereof, also distances between different first positioning devices 10 can be determined, using the same method as explained above for the second positioning device 20. Distances between different first positioning devices 10 may be stored in a memory 15 of one or more first positioning devices 10.

Figure 5:
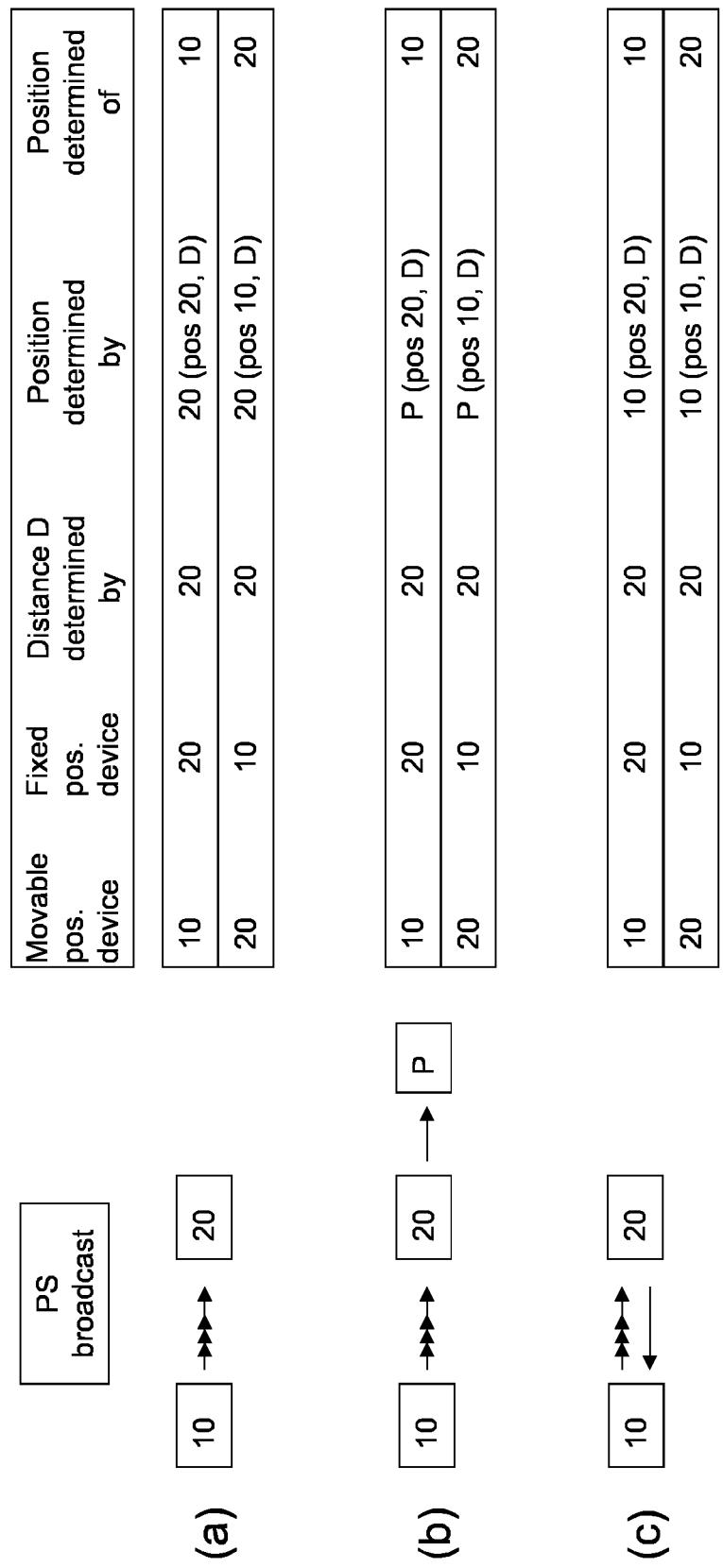
FIG. 5 depicts different circumstances (a), (b) and (c) of positioning devices determining a distance and a position relative to one another according to the present invention.

FIG. 5 illustrates some embodiments of positioning systems in accordance with the invention, which are generally described below. Communications between a first positioning device 10 and a second positioning device 20 are illustrated for different circumstances indicated by (a), (b) and (c).

In circumstance (a), the first positioning device 10 broadcasts a PS and a distance indication data signal, which is received by the second positioning device 20. Broadcasting the PS having varying broadcast powers is indicated by a composite arrow. In circumstance (a), the first positioning device 10 is movable while the second positioning device 20 is fixed (i.e. has a reference position, relative to which the position of the other positioning device may be determined), or the first positioning device 10 is fixed while the second positioning device 20 is movable. Both situations are explained by reference to a respective corresponding box in FIG. 5, circumstance (a).

In the upper corresponding box of circumstance (a), it is listed that in case the first positioning device 10 is movable and the second positioning device 20 is fixed and has a known position (pos 20), the second positioning device 20 may determine a distance D between the first positioning device 10 and the second positioning device 20 according to the method as explained above in relation to FIGS. 2 and 4. Then, from this distance D in combination with its own position (pos 20), the second positioning device 20 can determine the position (pos 10) of the first positioning device 10.

In the lower corresponding box of circumstance (a), it is listed that in case the second positioning device 20 is movable and the first positioning device 10 is fixed and has a known position (pos 10), the second positioning device 20 may determine a distance D between the first positioning device 10 and the second positioning device 20 according to the method as explained above in relation to FIGS. 2 and 4. Then, from this distance D in combination with the known position (pos 10) of the first positioning device 10, the second positioning device 20 can determine its own position (pos 20). The position (pos 10) of the first positioning device 10 may be broadcast by the first positioning device 10 in its PS by including position data in the PS, or may have been stored in advance (e.g. pre-programmed) in the memory 25 of the second positioning device 20.

In circumstance (b), the first positioning device 10 broadcasts a PS and a distance indication data signal, which is received by the second positioning device 20. Broadcasting the PS having varying broadcast powers is indicated by a composite arrow. In circumstance (b), the first positioning device 10 is movable while the second positioning device 20 is fixed, or the first positioning device 10 is fixed while the second positioning device 20 is movable. Both situations are explained by reference to respective corresponding boxes in FIG. 5, circumstance (b).

In the upper corresponding box of circumstance (b), it is listed that in case the first positioning device 10 is movable and the second positioning device 20 is fixed and has a known position (pos 20), the second positioning device 20 may determine a distance D between the first positioning device 10 and the second positioning device 20 according to the method as explained above in relation to FIGS. 2 and 4. Then, this distance D is transmitted to a processing device P. Also, the position (pos 20) of the second positioning device 20 is transmitted to the processing device P. Alternatively, the position (pos 20) may have been provided to the processing device P in another way, e.g. stored in advance or pre-programmed. Then, from the distance D in combination with the position (pos 20) of the second positioning device 20, the processing device P can determine the position (pos 10) of the first positioning device 10.

In the lower corresponding box of circumstance (b), it is listed that in case the second positioning device 20 is movable and the first positioning device 10 is fixed and has a known position (pos 10), the second positioning device 20 may determine a distance D between the first positioning device 10 and the second positioning device 20 according to the method as explained above in relation to FIGS. 2 and 4. Then, this distance D is transmitted to a processing device P. Also, the position (pos 10) of the first positioning device 10 is transmitted to the processing device P. Alternatively, the position (pos 10) may have been provided to the processing device P in another way, e.g. stored in advance or pre-programmed. Then, from the distance D in combination with the position (pos 10) of the first positioning device 10, the processing device P can determine the position (pos 20) of the second positioning device 20.

In circumstance (c), the first positioning device 10 broadcasts a PS and a distance indication data signal, which is received by the second positioning device 20. Broadcasting the PS having varying broadcast powers is indicated by a composite arrow. In circumstance (c), the first positioning device 10 is movable while the second positioning device 20 is fixed, or the first positioning device 10 is fixed while the second positioning device 20 is movable. Both situations are explained by reference to respective corresponding boxes in FIG. 5, circumstance (c).

In the upper corresponding box of circumstance (c), it is listed that in case the first positioning device 10 is movable and the second positioning device 20 is fixed and has a known position (pos 20), the second positioning device 20 may determine a distance D between the first positioning device 10 and the second positioning device 20 according to the method as explained above in relation to FIGS. 2 and 4. Then, this distance D is transmitted to the first positioning device 10. Also, the position (pos 20) of the second positioning device 20 is transmitted to the first positioning device 10. Alternatively, the position (pos 20) may have been provided to the first positioning device 10 in another way, e.g. stored in advance or pre-programmed. Then, from the distance D in combination with the position (pos 20) of the second positioning device 20, the first positioning device 10 can determine its own position (pos 10).

In the lower corresponding box of circumstance (c), it is listed that in case the second positioning device 20 is movable and the first positioning device 10 is fixed and has a known position (pos 10), the second positioning device 20 may determine a distance D between the first positioning device 10 and the second positioning device 20 according to the method as explained above in relation to FIGS. 2 and 4. Then, this distance D is transmitted to the first positioning device 10. Then, from the distance D in combination with its own position (pos 10), the first positioning device 10 can determine the position (pos 20) of the second positioning device 20.

Figure 6:
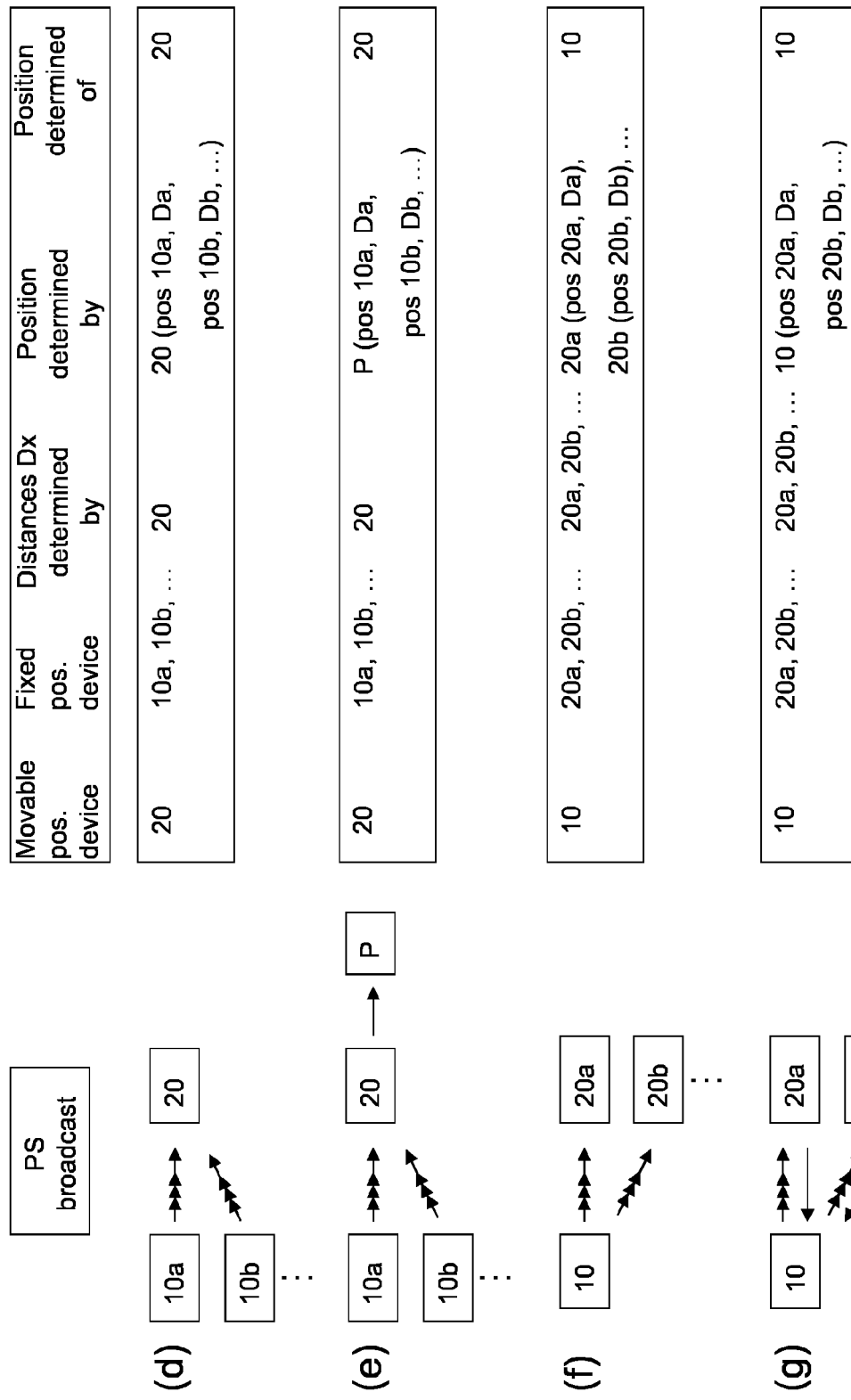
FIG. 6 depicts different circumstances (d), (e), (f) and (g) of positioning devices determining a distance and a position relative to one another according to the present invention.

FIG. 6 illustrates further embodiments of positioning systems in accordance with the invention, which are generally described below. Communications between a plurality of first positioning devices 10a, 10b, . . . and a second positioning device 20 are illustrated for different circumstances indicated by (d) and (e). Communications between a first positioning device 10 and a plurality of second positioning devices 20a, 20b, . . . are illustrated for different circumstances indicated by (f) and (g).

In circumstance (d), each of the first positioning devices 10a, 10b, . . . broadcasts a PS and a distance indication data signal, which PSs and distance indication data signals are received by the second positioning device 20. Broadcasting the PS having varying broadcast powers is indicated by composite arrows. In circumstance (d), the first positioning devices 10a, 10b, . . . are fixed (i.e. have a reference position, relative to which the position of one or more other positioning devices may be determined), while the second positioning device 20 is movable.

In the corresponding box of circumstance (d), it is listed that in case the second positioning device 20 is movable and the first positioning devices 10a, 10b, . . . are fixed and have known positions (pos 10a, pos 10b, . . . ), the second positioning device 20 may determine a distance Da, Db, . . . between each of the first positioning devices 10a, 10b and the second positioning device 20 according to the method as explained above in relation to FIGS. 2 and 4. Then, from these distances Da, Db, . . . in combination with the known corresponding positions (pos 10a, pos 10b, . . . ), the second positioning device 20 can determine its own position (pos 20). The positions (pos 10a, pos 10b, . . . ) of the first positioning devices 10a, 10b, . . . may be broadcast by the first positioning devices 10a, 10b, . . . in their PS by including position data in the PS, or may have been stored in the memory 25 of the second positioning device 20 in advance, e.g. pre-programmed. Each PS originating from a particular one of the first positioning devices 10a, 10b, . . . includes identification data such as to allow the second positioning device 20 to determine the distances Da, Db, . . . to each first positioning device 10a, 10b, . . . .

In circumstance (e), each of the first positioning devices 10a, 10b, . . . broadcasts a PS and a distance indication data signal, which PSs and distance indication data signals are received by the second positioning device 20. Broadcasting the PS having varying broadcast powers is indicated by a composite arrow. In circumstance (e), the first positioning devices 10a, 10b, . . . are fixed while the second positioning device 20 is movable.

In the corresponding box of circumstance (e), it is listed that in case the second positioning device 20 is movable and the first positioning devices 10a, 10b, . . . are fixed and have known positions (pos 10a, pos 10b, . . . ), the second positioning device 20 may determine a distance Da, Db, . . . between each of the first positioning devices 10a, 10b and the second positioning device 20 according to the method as explained above in relation to FIGS. 2 and 4. Each PS originating from a particular one of the first positioning devices 10a, 10b, . . . includes identification data such as to allow the second positioning device 20 to determine the distances Da, Db, . . . to each first positioning device 10a, 10b, . . . . Then, these distances Da, Db, . . . are transmitted to a processing device P. Also, the positions (pos 10a, pos 10b, . . . ) of the first positioning devices 10a, 10b, . . . are transmitted to the processing device P. Alternatively, the positions (pos 10a, pos 10b, . . . ) may have been provided to the processing device P in another way, e.g. stored in advance or pre-programmed. Then, from these distances Da, Db, . . . in combination with the corresponding positions (pos 10a, pos 10b, . . . ), the processing device P can determine the position (pos 20) of the second positioning device 20.

In circumstance (f), the first positioning device 10 broadcasts a PS and a distance indication data signal, which is received by each one of the second positioning devices 20a, 20b, . . . . Broadcasting the PS having varying broadcast powers is indicated by a composite arrow. In circumstance (f), the second positioning devices 20a, 20b, . . . are fixed while the first positioning device 10 is movable.

In the corresponding box of circumstance (f), it is listed that in case the first positioning device 10 is movable and the second positioning devices 20a, 20b, . . . are fixed and have known positions (pos 20a, pos 20b, . . . ), the second positioning devices 20a, 20b, . . . may determine a distance Da, Db, . . . between each of the second positioning devices 20a, 20b and the first positioning device 10 according to the method as explained above in relation to FIG. 2. Then, from these distances Da, Db, . . . in combination with the corresponding positions (pos 20a, pos 20b, . . . ), the processing device P can determine the position (pos 10) of the first positioning device 10.

In circumstance (g), the first positioning device 10 broadcasts a PS and a distance indication data signal, which is received by each one of the second positioning devices 20a, 20b, . . . . Broadcasting the PS having varying broadcast powers is indicated by a composite arrow. In circumstance (g), the second positioning devices 20a, 20b, . . . are fixed while the first positioning device 10 is movable.

In the corresponding box of circumstance (g), it is listed that in case the first positioning device 10 is movable and the second positioning devices 20a, 20b, . . . are fixed and have known positions (pos 20a, pos 20b, . . . ), the second positioning devices 20a, 20b, . . . may determine a distance Da, Db, . . . between each of the second positioning devices 20a, 20b and the first positioning device 10 according to the method as explained above in relation to FIG. 2. Then, these distances Da, Db, . . . are transmitted to the first positioning device 10. Also, the positions (pos 20a, pos 20b, . . . ) of the respective second positioning devices 20a, 20b, . . . are transmitted to the first positioning device 10. Alternatively, the position (pos 20a, pos 20b, . . . ) of the second positioning devices 20a, 20b, . . . may have been provided to the first positioning device in another way, e.g. stored in advance or pre-programmed. Then, from these distances Da, Db, . . . in combination with the corresponding positions (pos 20a, pos 20b, . . . ), the first positioning device 10 can determine the position (pos 10) of the first positioning device 10.

In the circumstances of FIGS. 5 and 6, a reference position may be transmitted to, and stored in any of the first positioning devices and second positioning devices to provide these devices with items of identification data which can be added to transmitted signals, whereby a discrimination of received signals is facilitated by checking the identification data of the received signals. As an example, a reference position may be an entrance of a building, or a floor of a building, such that only signals which contain identification data identifying a specific entrance or floor, respectively, of the building need to be taken into account by first and second positioning devices. Also for example a transmitter or RF-ID tag may be placed by e.g. entrances and sends a reference position signal with a short distance range of e.g. 1 meter. If a first or second positioning device passes by the transmitter placed by the entrance, the first or second positioning device knows that their starting position is by the entrance. In combination with another first or second positioning device placed in e.g. the centre of a room and the starting position the position of a first or second positioning device can be determined. This method can also be combined with sensors e.g. an accelerometer, a compass sensor and/or a gyroscope.

The position devices also have the ability to transmit their calculated position to other and/or identical positioning devices. The position device will send an ID-code, a position/location or a distance to another positioning device. The ID-code can be pre-programmed by the other positioning device and this ID-code can be linked to a person, animal or object. For example if a positioning device received an ID-code 8 the positioning device knows that it is e.g. a wallet. The positioning device can now track and trace the wallet and see the wallets position on e.g. a display (LCD screen). Different kind of communication possibilities between the position devices and their functionality are explained by the following examples.

Figure 7A:
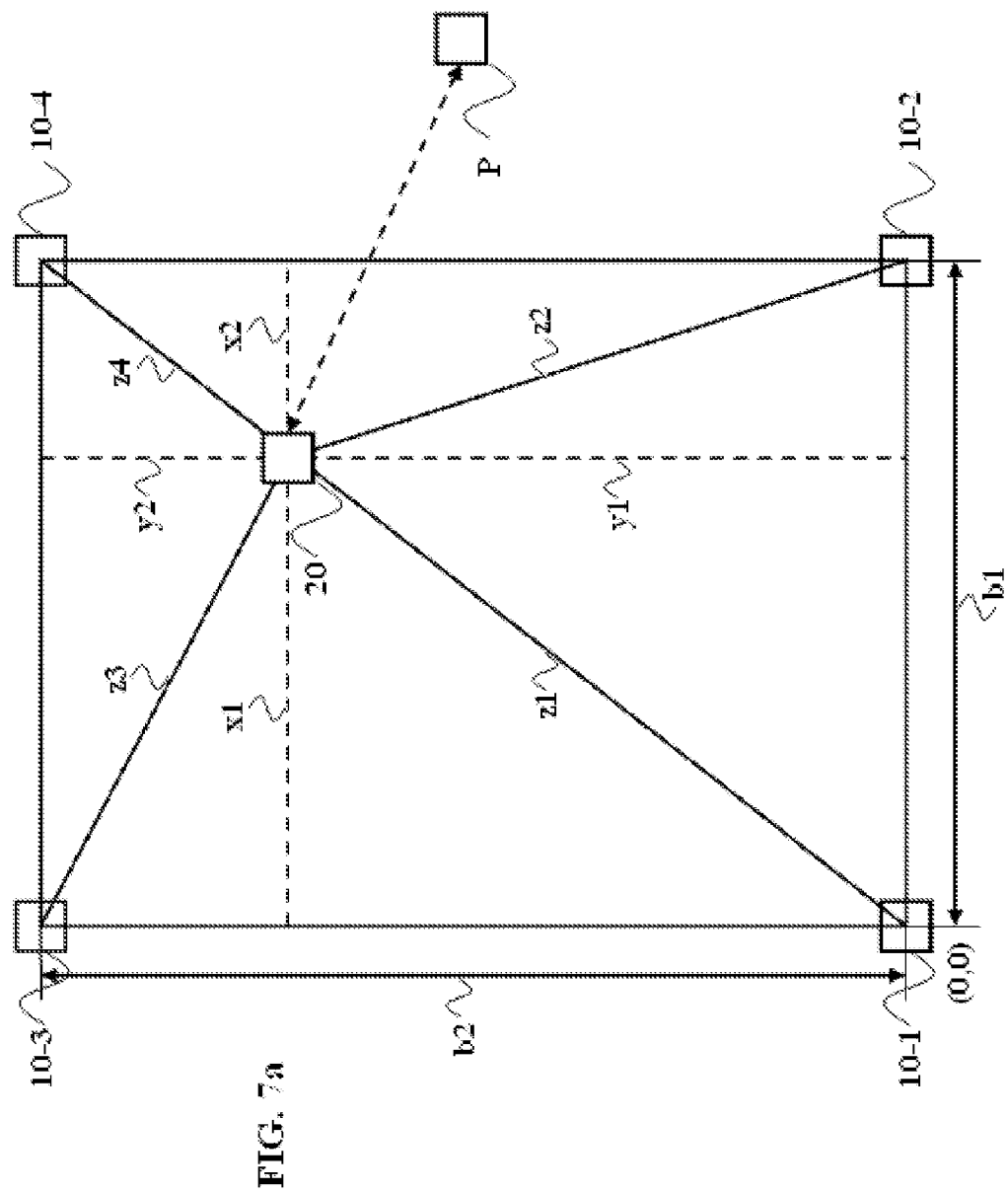
FIG. 7a depicts an arrangement of positioning devices to illustrate a method of determining a position of one of these positioning devices.

For example positioning devices 10a, 10b, . . . in FIGS. 6d and 6e may have the following communication possibilities with each other. In FIG. 7a the positioning devices are positioned in a rectangle. To determine the distance (b1) between 10-1 and 10-2 the positioning devices can send positioning signals and distance indication data signals to each other. If the positioning signals and distance indication data signals are received by 10-1 and 10-2 they can determine the distance (b1) between each other. If the distance (b1) is known between 10-1 and 10-2, this information can be transmitted to the other positioning devices 10-1, 10-2, 10-3 and 10-4 with an ID-code to distinguish the positioning devices from each other. Also the distance b1, b2, . . . can be combined with the positioning signals so that the receiver knows the distances between the positioning devices 10-1, 10-2, 10-3 and 10-4. Also the position of the positioning devices 10-1, 10-2, 10-3, 10-4, . . . can be send to each other.

In the second example positioning devices 20a, 20b, . . . in FIGS. 6f and 6g may have the following communication possibilities with each other. In FIG. 7a there is used for example one positioning device 20 but also more positioning devices can be used 20a, 20b, . . . etc. The positioning devices 20a, 20b, . . . can send positioning data to each other e.g. x, y and z coordinates and an ID-code to distinguish the positioning devices from each other. Also information collected by sensors can be send to the position devices and other information to communicate with each other. With the given information it is possible to track and trace persons, animals, objects and see their position on e.g. a display.

In the third example positioning devices 10a, 10b, . . . and 20a, 20b, . . . in FIGS. 6d, 6e, 6f and 6g may have the following communication possibilities with each other. Positioning devices 10a, 10b, . . . send positioning signals with a ID-code to distinguish the positioning devices from each other to 20a, 20b, . . . . If 20a, 20b, . . . have determined the distances or position this information can be send to 10a, 10b, . . . or a processing device P with a ID-code to distinguish the positioning devices from each other. Also the information that 10a, 10b, . . . has received from 20a, 20b, . . . can be send to a processing device P with an ID-code to distinguish the positioning devices from each other. The examples mentioned above can also be combined with each other.

FIG. 7a illustrates, for a two-dimensional situation, a determination of a position of a second positioning device

20 in a rectangular area having four first positioning devices 10-1, 10-2, 10-3 and 10-4, similar to the circumstance (d) or (e) as shown in, and explained by reference to FIG. 6. A distance between first positioning device 10-1 and first positioning device 10-2 is known, and is equal to b1. A distance between first positioning device 10-1 and first positioning device 10-3 is also known, and is equal to b2. The values of the distances b1 and b2 may be stored in memory 25 of the second positioning device 20.

As explained above, the (controller 24 of the) second positioning device 20 may determine a distance z1 to the first positioning device 10-1, a distance z2 to the first positioning device 10-2, and a distance z3 to the first positioning device 10-3, by extracting the identification data and the distance indication codes from the positioning signals broadcast by each one of the first positioning devices 10-1, 10-2 and 10-3. Then, coordinates of the position of the second positioning device 20, when seen in a two-dimensional coordinate (x, y) system, are (x1, y1), and can be calculated from formulas (1)-(4) below (using Heron's formula):

$$s1=(z1+z2+b1)/2 \qquad (1)$$

$$s2=(z1+z3+b2)/2 \qquad (2)$$

$$x1=2(s2(s2-z1)(s2-b2)(s2-z3))^{0.5}/b2 \qquad (3)$$

$$y1=2(s1(s1-z1)(s1-b1)(s1-z2))^{0.5}/b1 \qquad (4)$$

where the position of first positioning device 10-1, when seen in the two-dimensional coordinate system, may be considered (0, 0).

In an analogous way as using the first positioning devices 10-1 and 10-2 to determine y1, the first positioning devices 10-3 and 10-4, and distances z3 and z4 from the second positioning device 20 to the first positioning devices 10-3 and 10-4, respectively, can be used to determine y2, where y1=b2−y2. Also, in an analogous way as using the first positioning devices 10-1 and 10-3 to determine x1, the first positioning devices 10-2 and 10-4, and distances z2 and z4 from the second positioning device 20 to the first positioning devices 10-2 and 10-4, respectively, can be used to determine x2, where x1=b1−x2.

Similarly, a position of a second positioning device 20 can be calculated with other positions of first positioning devices 10.

In the example given above, a position of a second positioning device 20 is determined in two dimensions. Similarly, a position of a second positioning device 20 may be determined in three dimensions by also taking into account the position of the first positioning devices in a third dimension. For example if the height of a first positioning device 10-1 is 5 meter of the ground and the height of a second positioning device 20 is 1.5 meter of the ground the real height difference would be 5 meter−1.5 meter=3.5 meter. If the second positioning device 20 receives a distance indication data signal of 10 meter, the real distance between the first and second positioning device would be 9.37 meter (calculated with Pythagoras' theorem), if the height is taken into account. If the height is also used to calculate the x and y coordinates the accuracy of the position of a first or second positioning device will be more accurate. A positioning device can have a pre-programmed height value. If for example the positioning device is used for navigation by a person the pre-programmed height can be e.g. 1 meter. Also a person may have the possibility to input the height of the positioning device into the memory of a positioning device to create a higher accuracy of the position. The height can also be measured by another positioning device or by e.g. a laser that is built in a positioning device. Appropriate mathematical formulas can be used to determine a position, or coordinates, of a second positioning device 20 from distances determined between the second positioning device 20 and a plurality of first positioning devices 10 at different positions in a three-dimensional space.

Returning to the example of FIG. 7a, more first positioning devices 10 than strictly required for determining a position of a second positioning device 20 may be used to improve the accuracy of the position determination of the second positioning device 20. For example, in the configuration of FIG. 7a, an improved x-coordinate $x1_{imp}$ may be obtained by averaging the values x1 and x2 as calculated in the formulas (1)-(4) in accordance with formula (5) below:

$$x1_{imp}=(x1+(b1-x2))/2 \qquad (5)$$

On the other hand, in some circumstances, a low accuracy of position determination, or an estimate of a position, may be sufficient. For example, if only the information is required that the second positioning device 20 is located somewhere along a line parallel to the lines x1, x2, and half way between first positioning devices 10-1 and 10-3, then it suffices to determine that the distance between second positioning device 20 and first positioning device 10-1 is the same as the distance between second positioning device 20 and first positioning device 10-3.

In FIG. 7a, a processing device P may be coupled to the second positioning device 20. In particular, in case the second positioning device 20 does not have a possibility to display a distance or position, then distance data and/or position data may be transmitted to the processing device P for display or for analysis. For example, the processing device P may provide a map shown on a display, and may show a position of the second positioning device 20 on this map. More than one processing device P may be used for different subareas of the rectangular area shown in FIG. 7a. Different processing devices P may exchange data between one another. Also, different processing devices P may be used as relaying devices if the area to be covered is large. Also, processing tasks may be distributed over different processing devices P to lower the processing load of each of the processing devices P.

Figure 7B:
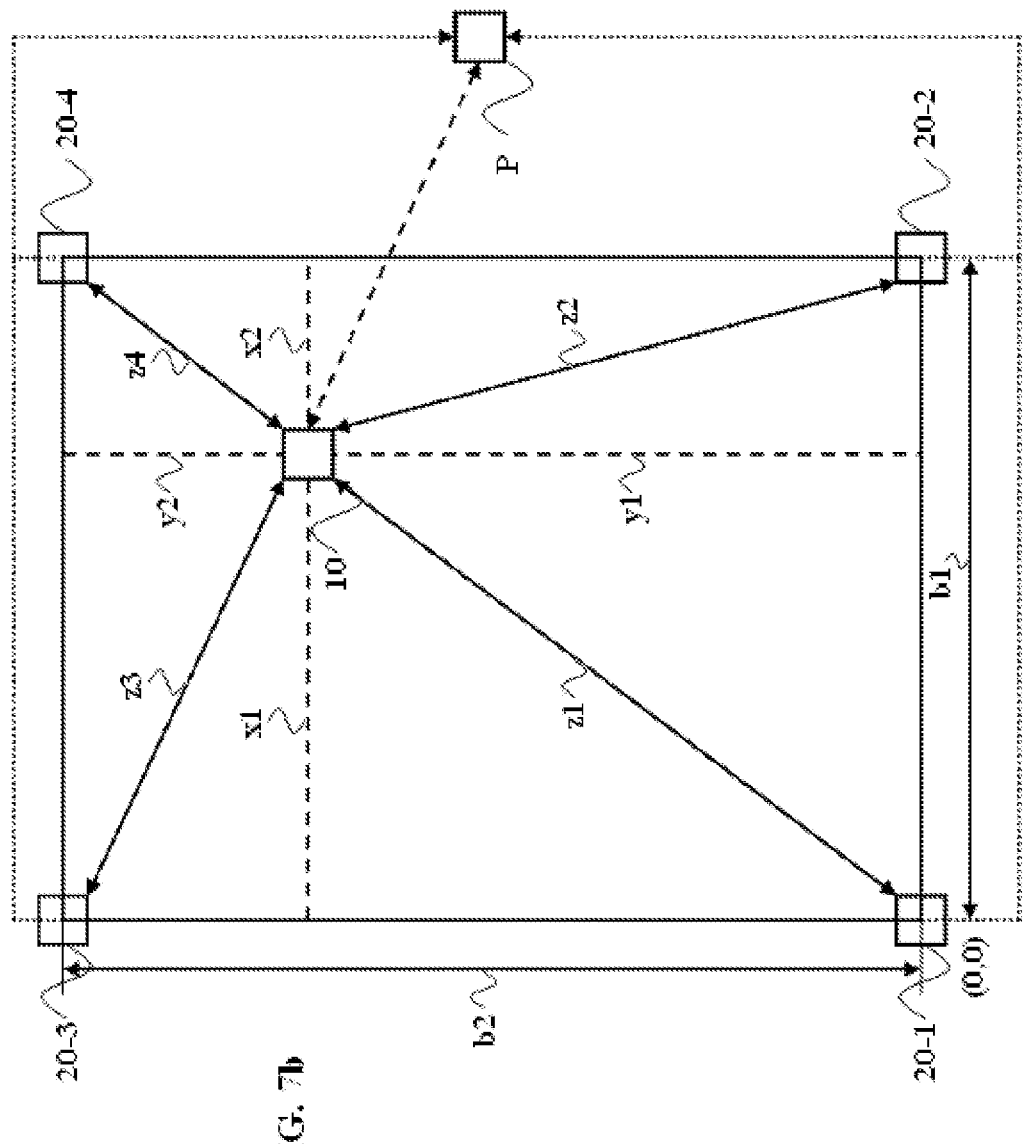
FIG. 7b depicts another arrangement of positioning devices to illustrate a method of determining a position of one of these positioning devices.

FIG. 7b illustrates a situation in accordance with circumstance (f) or circumstance (g) of FIG. 6. Three modes of operation may be envisaged.

In a first mode of operation, the first positioning device 10 transmits positioning signals which are received by second positioning devices 20-1, 20-2, 20-3 and 20-4. The second positioning devices 20-1, 20-2, 20-3 and 20-4 determine the distances to the first positioning device 10. Each of the second positioning devices 20-1, 20-2, 20-3 and 20-4 then transmits its distance data to the first positioning device 10 together with identification data uniquely identifying the second positioning device from which the distance data originates. Based on known positions of the second positioning devices 20-1, 20-2, 20-3 and 20-4, the first positioning device 10 may then determine its position.

In case more than one first positioning device 10 is present, each first positioning device 10 transmits its positioning signals together with identification data uniquely identifying the first positioning device from which the positioning signals originate. In this case, each of the second positioning devices 20-1, 20-2, 20-3 and 20-4 then transmits its distance data together with identification data uniquely identifying the first positioning device from which the positioning signals originate, as well as uniquely identifying the second positioning device from which the distance data originates. Only the first positioning device for which the distance data are intended (as appears from the identification data containing an identification of this first positioning device) may then use the distance data to determine its position.

In a second mode of operation, the first positioning device 10 transmits positioning signals which are received by second positioning devices 20-1, 20-2, 20-3 and 20-4. The second positioning devices 20-1, 20-2, 20-3 and 20-4 determine the distances to the first positioning device 10. Each of the second positioning devices 20-1, 20-2, 20-3 and 20-4 then transmit its distance data to a processing device P together with identification data uniquely identifying the second positioning device from which the distance data originates. Based on known positions of the second positioning devices 20-1, 20-2, 20-3 and 20-4, the processing device P may then determine the position of the first positioning device 10. The processing device P may transmit this position to the first positioning device 10.

In case more than one first positioning device 10 is present, each first positioning device 10 transmits its positioning signals together with identification data uniquely identifying the first positioning device from which the positioning signals originate. In this case, each of the second positioning devices 20-1, 20-2, 20-3 and 20-4 then transmits its distance data together with identification data uniquely identifying the first positioning device from which the positioning signals originate, as well as uniquely identifying the second positioning device from which the distance data originates, to the processing device P. The processing device P then uses the distance data to determine the position of each first positioning device 10.

In a third mode of operation, the first and second modes are combined, that is: the first positioning device 10 determines its own position, and the processing device P determines the position of the positioning device 10, and both positions may be compared after exchange of the position between the positioning device 10 and the processing device P.

Figure 8:
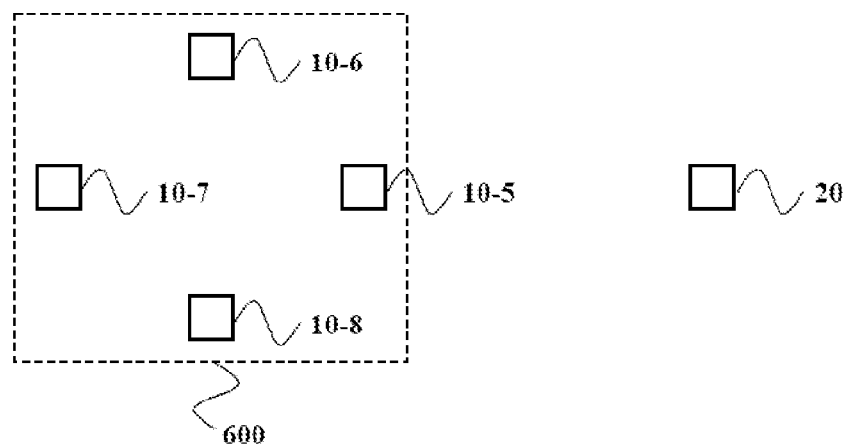
FIG. 8 depicts a further arrangement of positioning devices to illustrate a method of determining a position of one of these positioning devices.

FIG. 8 illustrates a third positioning device 600 comprising an assembly of first positioning devices 10-5, 10-6, 10-7, 10-8, similar to the circumstance (d) or (e) as shown in, and explained by reference to FIG. 6. The third positioning device 600 is used for a second positioning device 20 to determine its location or position relative to the third positioning device 600. In the embodiment of the third positioning device 600 as shown, the number of first positioning devices 10-5, 10-6, 10-7, 10-8 is four, however in general, at least two first positioning devices 10-*x* may be applied in a third positioning device 600. More than two, e.g. more than four, first positioning devices may be applied to enhance an accuracy of a determination of location or position. The second positioning device 20 is configured to receive positioning signals of varying broadcast power and distance indication data signals including identification data from each first positioning device 10-5, 10-6, 10-7, 10-8 in the third positioning device 600, and to determine its distance to each first positioning device 10-5, 10-6, 10-7, 10-8 as explained above with reference to FIGS. 2 and 4. The second positioning device 20 comprises information on the position of each one of the first positioning devices 10-5, 10-6, 10-7, 10-8 in the third positioning device 600. With this information, and the distances determined between the second positioning device 600 and each one of the first positioning devices 10-5, 10-6, 10-7, 10-8 in the third positioning device 600, a position of the second positioning device 20 can be determined in the (controller 24 of the) second positioning device 20.

As an example, it is assumed that the first positioning devices 10-5, 10-6, 10-7, 10-8 are located at the corners of an imaginary square, where the distance between the first positioning devices 10-5 and 10-7 is equal to the distance between the first positioning devices 10-6 and 10-8, and said distance is 0.10 meter. When the second positioning device 20 determines the distance between the first positioning device 10-5 and the second positioning device 20 as 5.00 meters, the distances between each one of the first positioning devices 10-6 and 10-8 and the second positioning device 20 as 5.05 meters, and the distance between the first positioning device 10-7 and the second positioning device 20 as 5.10 meters, the second positioning device 20 determines that it is positioned on a line through the first positioning devices 10-5 and 10-7 at a distance of 5.00 meters from first positioning device 10-5 at the side facing away from first positioning device 10-7. Thus, the position of the second positioning device 20, at a known position and orientation of the third positioning device 600, can be uniquely established by the second positioning device 20 in the one-way communication from the third positioning device 600 to the second positioning device 20.

If the second positioning device 20 would broadcast the distances determined relative to each one of the first positioning devices 10-5, 10-6, 10-7, 10-8 to the respective ones of the first positioning devices 10-5, 10-6, 10-7, 10-8, the position or orientation of the third positioning device 600, processing these distances, can be uniquely established in the two-way communication between the third positioning device 600 and the second positioning device 20, provided that the third positioning device 600 stores the position of the second positioning device 20.

Figure 9:
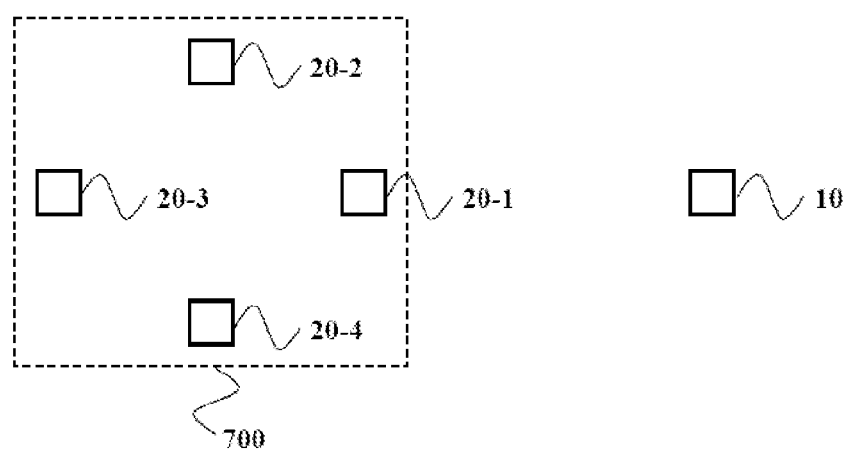
FIG. 9 illustrates a still further arrangement of positioning devices to illustrate a method of determining a position of one of these positioning devices.

FIG. 9 illustrates a fourth positioning device 700 comprising an assembly of second positioning devices 20-1, 20-2, 20-3, 20-4. The fourth positioning device 700 is used to determine a position of a first positioning device 10 relative to the fourth positioning device 700. In the embodiment of the fourth positioning device 700 as shown, the number of second positioning devices 20-1, 20-2, 20-3, 20-4 is four, however in general, at least two second positioning devices 20-*x* may be applied in a fourth positioning device 700. More than two, e.g. more than four, second positioning devices may be applied to enhance an accuracy of a determination of location or position. The first positioning device 10 is configured to broadcast positioning signals of varying broadcast power and distance indication data signals, as explained above with reference to FIGS. 2-4. Each one of the second positioning devices 20-1, 20-2, 20-3, 20-4 is configured to determine its distance to the first positioning device 10, as explained above with reference to FIGS. 2 and 4. With the distances determined between the first positioning device 10 and each one of the second positioning devices 20-1, 20-2, 20-3, 20-4 in the fourth positioning device 600, a position of the first positioning device 10 can be determined in (a controller of the) fourth positioning device 600, similar to the circumstance (f) and/or (g) as shown in, and explained by reference to FIG. 6.

As an example, it is assumed that the second positioning devices 20-1, 20-2, 20-3, 20-4 are located in the fourth positioning device 700 at the corners of an imaginary square, where the distance between the second positioning devices 20-1 and 20-3 is equal to the distance between the second positioning devices 20-2 and 20-4, and said distance is 0.10 meter. When the second positioning device 20-1 determines the distance between the second positioning device 20-1 and the first positioning device 10 as 5.00 meters, and the second positioning devices 20-2 and 20-4 determine the distances between each one of the second positioning devices 20-2 and 20-4 and the first positioning device 10 as 5.05 meters, and the second positioning device 20-3 determines the distance between the second positioning device 20-3 and the first positioning device 10 as 5.10 meters, it may be determined by (a controller of the) fourth positioning device 700 that the first positioning device 10 is positioned on a line through the second positioning devices 20-1 and 20-3 at a distance of 5.00 meters from second positioning device 20-1 at the side facing away from second positioning device 20-3. Thus, the position of the first positioning device 10, at a known position and orientation of the fourth positioning device 700, can be uniquely established by the fourth positioning device 700 in the one-way communication from the first positioning device 10 to the fourth positioning device 700.

Similar to the circumstance (g) as shown in, and explained by reference to FIG. 6, if the second positioning devices 20-1, 20-2, 20-3, 20-4 in the fourth positioning device 700 would broadcast the distances determined relative to the first positioning device 10 to the first positioning device 10, the position of the first positioning device 10, processing these distances, can be uniquely established by the first positioning device 10 in the two-way communication between the first positioning device 10 and the fourth positioning device 700, provided that the first positioning device 10 stores the positions of the second positioning devices 20-1, 20-2, 20-3, 20-4.

Figure 10:
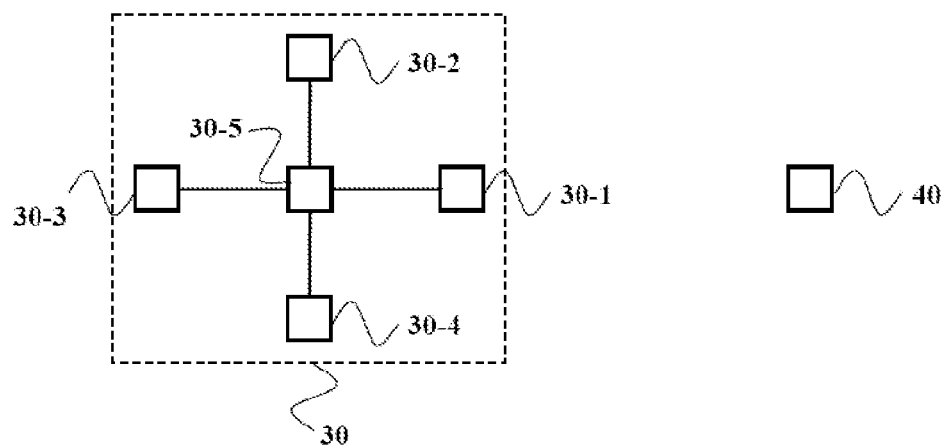
FIG. 10 illustrates still a further arrangement of positioning devices.

FIG. 10 illustrates a fifth positioning device 30 comprising an assembly of first or second positioning devices 30-1, 30-2, 30-3, 30-4 connected to a central processing unit 30-5. The central processing unit 30-5 comprising component parts such as a transceiver (transmitter and receiver), an antenna assembly, an energy source, a controller (comprising a data processing unit), a memory, an output device and a sensing device. In some embodiments, the central processing unit 30-5 comprises a switching device.

The fifth positioning device 30 is used to determine a position of a second and/or first positioning device 40 and a position of the fifth positioning device 30 relative to each other, where both may be movable. In the embodiment of the fifth positioning device 30 as shown, the number of first and/or second positioning devices 30-1, 30-2, 30-3, 30-4 is four, however in general, at least two first and/or second positioning devices 30-x may be applied in a fifth positioning device 30. More than two, e.g. more than four, first and/or second positioning devices may be applied to enhance an accuracy of a determination of location or position.

Figure 11:
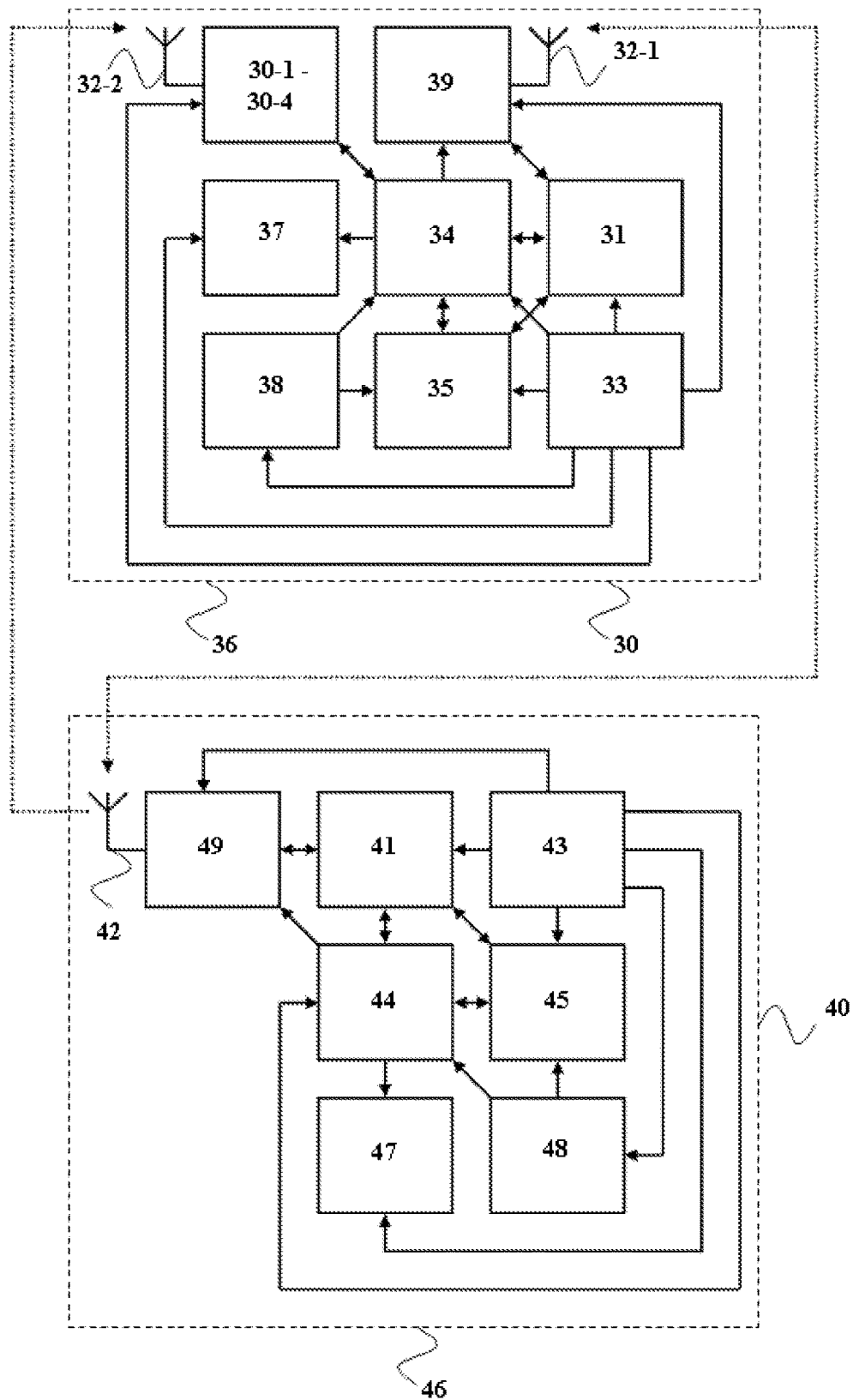
FIG. 11 illustrates block diagrams of two positioning devices according to the present invention, component parts thereof, and their interaction.

FIG. 11 illustrates the fifth positioning device 30 comprising component parts such as a radio frequency, RF, transceiver (transmitter and receiver) 31, an antenna assembly 32-1, an antenna assembly 32-2, an energy source 33, a controller 34 (comprising a data processing unit), a memory 35, an output device 37, a sensing device 38 and receivers 30-1, 30-2, 30-3 and 30-4. Each receiver is coupled to one of a plurality of spaced antennas (to allow for a determination of a direction) of the antenna assembly 32-2. Any combination of said component parts may be manufactured as an integrated unit, and may include a housing 36.

A sixth positioning device 40 comprises component parts such as an RF transceiver (transmitter and receiver) 41, an antenna assembly 42, an energy source 43, a controller 44 (comprising a data processing unit), and a memory 45. Any combination of said component parts may be manufactured as an integrated unit, and may include a housing 46. In some embodiments, the sixth positioning device 40 comprises an output device 47 and a sensing device 48. The fifth and sixth positioning device 30 and 40 may comprise a switching device 39 and 49, respectively, controlled by the controller 34 and 44, respectively, to switch to the antenna to be used to broadcast (a) positioning signal(s) having (a) predetermined broadcast range(s).

Figure 12:
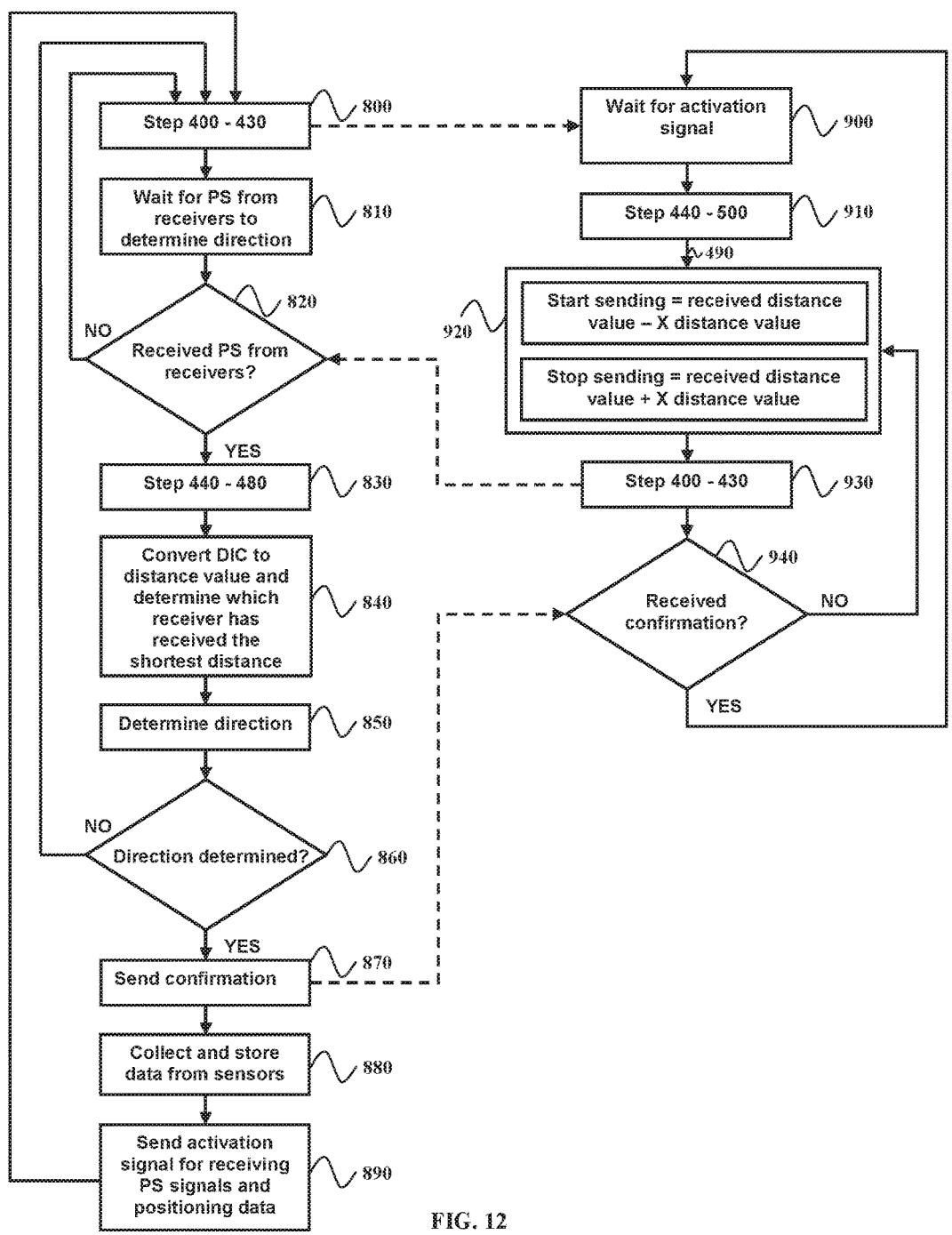
FIG. 12 depicts a flow diagram illustrating a process of determining distances between a fifth positioning device and a sixth positioning device according to the present invention.

Referring to FIGS. 11 and 12, the sixth positioning device 40 may have an initially unknown position to be determined (for example: the sixth positioning device 40 is coupled to a key ring). The fifth positioning device 30 broadcasts positioning signals, some of which will be received by the sixth positioning device 40 (step 800). Upon receipt of the positioning signals, the sixth positioning device 40 determines the distance between the fifth positioning device 30 and the sixth positioning device 40 (steps 900, 910). Assuming that this distance is e.g. 5 meter, the sixth positioning device 40 broadcasts positioning signals of e.g. 4.50, 4.60, 4.70 . . . 5.50 meter (steps 920, 930). Then, positioning device 30 determines which receiver 30-1, 30-2, 30-3, 30-4 detected the shortest distance, and then transmits an acknowledge signal to the sixth positioning device 40 to cause the sixth positioning device 40 to stop broadcasting (steps 820-870, 940). Once the direction to the sixth broadcasting device 40 is known, a navigation towards the sixth positioning device 40 may be performed, for example supported by sensors like an accelerometer and/or a gyroscope (step 880). Alternatively, or additionally, the position data, or the positioning signals may be requested at specific time intervals, or a user may request these data, for example by pushing a button (step 890). When the distance is known, the fifth positioning device 30 may adapt its broadcast range to save energy. Also the information that is collected by the above mentioned positioning devices can be send to a processing device P.

In the above, it is assumed that the sixth positioning device 40 is fixed (does not move), but if it is, positioning signals or position data should be retrieved real-time or at appropriate time intervals.

It is noted that also two fifth positioning devices 30 may be used, which devices both may determine their position, and the position of the other ones of the fifth positioning devices 30. Also, a plurality of sixth positioning devices 40 may communicate with one fifth positioning device 30. Also a receiver 30-1 or receivers that circles with a mechanism around the central processing unit 30-5 with a certain speed can determine the direction of a positioning device. If a distance indication data signal is received by the receiver 30-1 the central processing unit 30-5 and/or the receiver 30-1 then determines the amount of degrees the receiver 30-1 is positioned when it receives a distance indication data signal. The central processing unit 30-5 then measures the degrees and distance indication data signals on different points and with this information the central processing unit 30-5 can determine the direction of a positioning device.

Figure 7C:
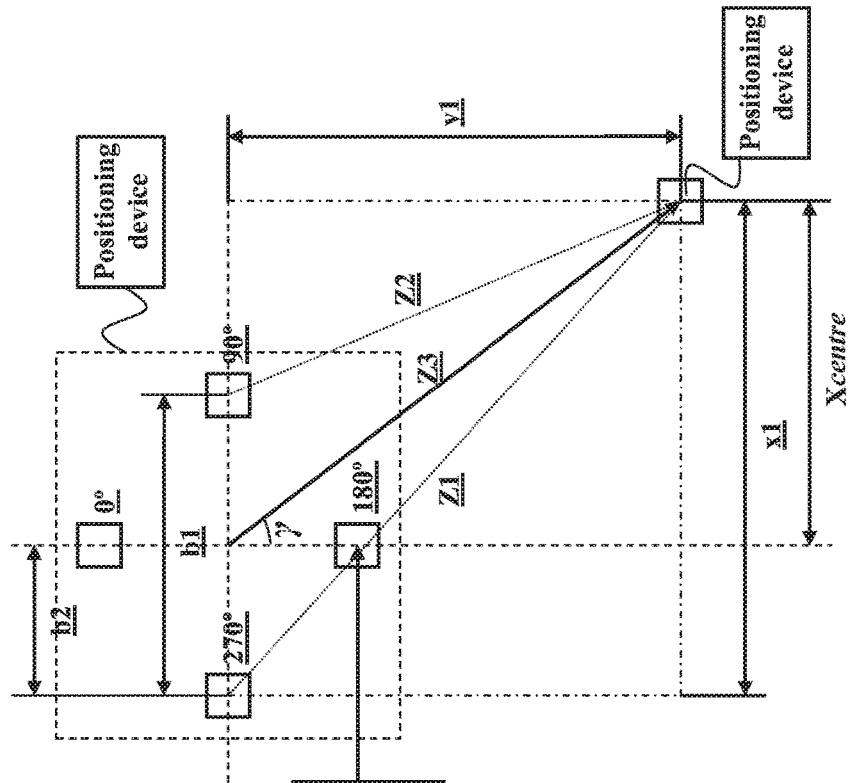
FIG. 7c depicts still another arrangement of positioning devices to illustrate a method of determining a position of one of these positioning devices.

Referring to FIGS. 8, 9, 10, 11 and 12, the positioning device that calculates the direction and position of the moving positioning device can also use mathematical formula's to determine the direction and position of a moving positioning device. FIG. 7c illustrates, for a two-dimensional situation, a determination of a position of a positioning device. For example if all the distances are received by e.g. 30-1, 30-2, 30-3 and 30-4 between the moving position device and the positioning device that calculates the direction and position, mathematical formula's like triangular calculations e.g. Heron's formula and angle calculations e.g. sines, cosines, tangents etc. can be used to determine the distance, position and angle of a moving positioning device. Also the height of the positioning devices can be taken into account by calculating the direction, distance and position. To determine the height or the z coordinate more positioning devices or receivers can be used. For example in FIG. 10 above and below the central processing unit 30-5 more receivers can be positioned e.g. 30-6 and 30-7. By using the distance differences between 30-6 and 30-7 and a positioning device it is possible to calculate the height. If the height of e.g. a fifth positioning device 30 is inputted by the user or pre-programmed, the height that the sixth positioning device 40 is of the ground can be determined.

In the embodiments above, a broadcast signal intended to be received and processed by a particular positioning device, is configured to carry identification data of said particular positioning device to be able to discriminate the broadcast signal between other broadcast signals. In some embodiments, a signal carrying identification data, when received by a particular positioning device which is identified by said identification data, is used to activate the particular positioning device.

The system described above, comprising at least one first positioning device and at least one second positioning device, may be applied for companies, individuals, government bodies, organizations, scientific applications, etc., to provide information on the position of objects, such as products, persons, animals, etc., when such objects comprise and/or are connected or coupled to at least one first positioning device or at least one second positioning device.

This system can measure and register the activity within an area e.g. shop, amusement park, museum, festival etc., and use this to analyse the situation and development. This information can be used to adjust and improve the tactics and strategies depending on the objectives.

For example, the system may be used in a supermarket. The supermarket is divided in areas for different categories of products, such as fresh products, meat products, fish products, breakfast products, beverages, dairy products, frozen products, personal care products, non-food, etc. Segmentation of products can also be linked to other criteria like price clusters, promotional areas (display's) and activities e.g. cash register, demonstration etc. Thus, the position of various areas, or even sub-areas within an area, may be recorded. Consumers shopping in the supermarket may carry a first positioning device or a second positioning device configured to track the consumers' position, possibly the consumers' position in time. Based on this information, key performance indicators may be established to analyze the performance of the supermarket. For example, for the supermarket, it may be analyzed which category of products the clients are most or least interested in, which shopping areas attract most or least attention, which walking routes may be preferable, etc.

Shelves in a shop or supermarket may comprise one or more first positioning devices or one or more second positioning devices to determine distances to customers, or objects taken along by customers, such as cards, carts or baskets. Objects provided with, or connected or coupled with a first positioning device or a second positioning device may store, or may have the identification data thereof associated with, a personal identification temporarily or permanently associated with a person using the object, such that a distance or position determined in accordance with the present invention may be linked to a person.

As an example, a shopping cart may comprise at least one first positioning device or second positioning device, powered by a generator generating power from the rotation of wheels of the shopping cart.

Figure 14:
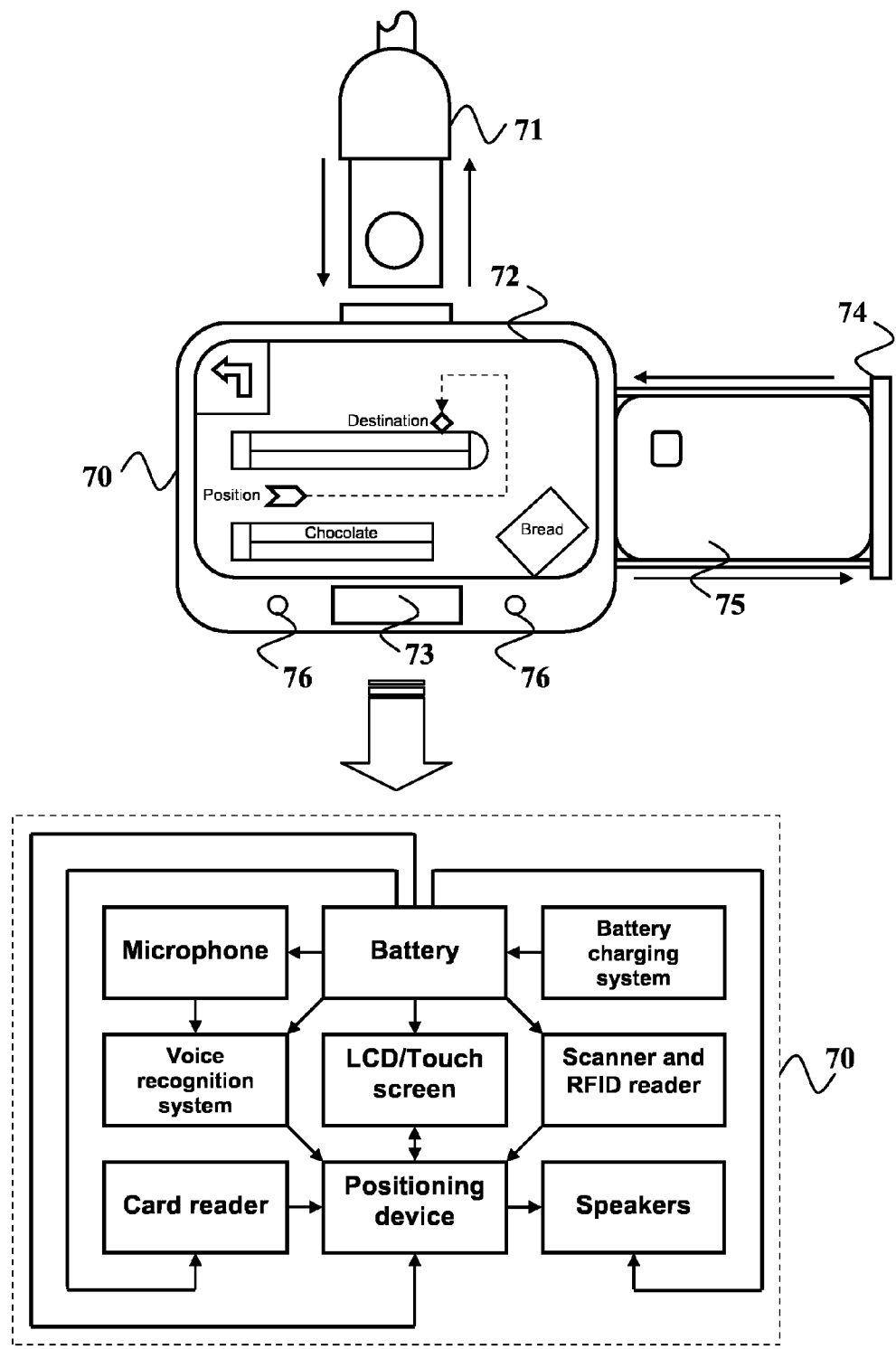
FIG. 14 illustrates a view of a positioning device, also in block diagram, to be attached on a shopping cart.

FIG. 14 gives an example of a positioning device 70 that can be attached to a shopping cart. Positioning device 70 contains a touch screen device 72 that can be used to navigate the shopper to his/her products. The shopper can for example input his/her shopping list at home on a website from the company. This website is connected with a processing device P and on arrival in the store the consumer can input his/her password and username on the screen of the shopping cart to get e.g. his/her shopping list. Instead that the display/touch screen device 72 is attached to positioning device 70, it can also be placed on another location of the shopping cart e.g. the display 72 can be attached at the nose of a shopping cart and is connected wired or wireless with a positioning device. Also a card 75 with e.g. a chip, magnetic strip, and/or barcode can be inputted in a slot 74 or scanned by a scanner e.g. bar-code reader 73 that is connected to the touch screen device 72 and this card 75 may contain login data and a ID-code of the shopper. The scanner 73 can also be used to scan barcodes of items/products to get additional information like price, calories etc. If the shopper inputs his/her user name and password or scans or puts the card 75 in the slot 74 the touch screen device 72 will connect with the processing device P, internet etc. to get the users shopping list and other information. The shopper can now navigate to his/her products. Also the card 75 can be used as e.g. a discount card by the check-out point or as loyalty card. The screen 72 can also show the position of e.g. a friend, neighbor, acquaintance, family member etc. if there are shopping in the same store. For example the user can at home e.g. on the internet make a friends list that can give your friends the possibility to see your position in the store and these friends can also give the shopper the possibility to see their position if they are in the store. A lock 71 works like the traditional coin operated mechanisms of shopping carts. Instead of, or in addition to a coin, a card 75 is used to unlock the shopping cart, and if the shopping cart is placed back in the lock 71, the card 75 can be retrieved from the slot 74. Also for example before the system unlocks the shopping cart, the positioning device 70 first checks the ID-code and security information on the card 75, and then the shopper can input a password for unlocking the shopping cart.

The locking mechanism 71 can also be used as a battery charger. If the locking mechanism is connected to the positioning device 70 the battery can be charged or the locking mechanism 71 can be used to upload or download data. Also other methods for charging the battery can be used. If the shopping cart is not moving for a while the positioning device 70 can go e.g. in a sleep mode or ultra low power mode to preserve the battery power. If there is information stored in the memory of the positioning device 70, this information can be sent real time, with a time delay or this information can be retrieved when the shopping cart is nested with the other shopping carts and being charged. If the shopping cart is being charged, the battery life is preserved and the processing device P can then for example download the collected data, upload software updates or other information. The connection with the processing devices can be e.g. wired, wireless or other means to connect to the processing device can be used. Because there is a touch screen device 72 attached to the shopping cart, the shopper can type a product name or brand in to the system, but in other embodiments the product name or brand can be spoken by the shopper. The positioning device 70 may use a microphone 76 to collect the spoken words and these words are compared with words in the database of the positioning device 70. If the spoken word corresponds to a word in the database the system will ask the shopper for a confirmation and will then navigate to the product or brand. Also positioning device 70 can be used to alarm the employees of the store or the positioning device 70 can give a warning signal if a shopping cart leaves a designated area that is determined based on the position of the shopping cart. For example, if a shopping cart leaves the designated area the touch screen device 72 of the positioning device 70 will start a countdown. If the shopping cart is not returned in e.g. 15 seconds a alarm (sound or visual) will go off on the shopping cart, or an electronic locking wheel or 'boot' will block the wheels of the shopping cart, or a signal is sent to the employees of the store with a warning that a shopping cart is leaving a designated area etc. These methods can also be combined with each other. Also with the mobile positioning device 30 the employees of the store can track the position of missing shopping carts (by a method explained above with reference to positioning devices 30 and 40). The positioning device 70 can also be used for luggage carts at airports. The traveler can scan his/her boarding pass or ticket by the positioning device 70 and the system can then navigate the traveler to the terminal and to the gate where the traveler must board the aircraft. Also a parking ticket can be scanned by the positioning device 70 to navigate the traveler to the parking lot. The boarding pass, flight ticket or parking ticket can have e.g. a bar-code or smart label (RFID) with information of the terminal number, gate number, parking lot number, flight number, aircraft number etc. The screen of the positioning device 70 can give the traveler information about time of arrival of the aircraft, time of departure of the aircraft and other information that is relevant to the traveler and also for example advertising can be given on the screen. Also a docking station or an attachment device can be attached to the shopping cart or luggage cart to connect e.g. a mobile phone, tablet PC, positioning device etc. that is equipped with positioning software. FIG. 13b illustrates a method to navigate around objects wherein navigation coordinates are used. FIG. 13b further illustrates, positioning devices that are placed in objects and have the ability to give a visualization of the object or their form.

Shelves in a store can be equipped with positioning devices. The term shelf is used as an example but can also be any other object. This positioning device stores for example information about the shelves. This information can be for example position, length, width, height, weight, products, category, navigation coordinates, colour that refers to zone etc. If the positioning device is centred or placed in all the shelves in a store there can be made a scan of all the positioning devices. If the scan is made the positioning device can make a map of all the objects in the store and give information about the objects. If the shelve has the shape of a square on each corner of the square a positioning device can be placed. The system can recognise the corners of an object and can then determine the size of it. For example identification numbers can be pre-programmed in the memory of a positioning device and the information that is linked to the identification number can give a visualisation of an object on e.g. a display, such as an LCD screen. If for example an ID-code is 10 the object can have for example the following measurements length 6, width 3, height 4 (object I), diameter 5 (object II) etc. The system knows the measurements of a form e.g. a rectangle (object I), a circle (object II) etc. If the positioning device has a direction sensor e.g. gyroscope, compass etc. the direction of the object can also be given for example front, back etc. If the object is moving a motion-sensor e.g. an accelerometer can measure the speed of an object. The method can also be used to give a visualisation of people, animals etc.

Because the positioning devices have information about the position and the size of a shelf it is possible to make a detailed map of the obstacles that are in the store. This information is also useful to navigate around the shelves in the store and its not necessary that an organisation must make a detailed map of the obstacles that are in the store. Also if a shelf or other obstacle in a store is moved, the system will automatically update the map. Another possibility is that the map is pre-programmed or can be downloaded from a site. To navigate around the obstacles in a store, the navigation coordinates that the positioning device from a shelf sends helps to navigate around an obstacle. For example the navigation coordinates can consist of four coordinates that are positioned around the corners of a shelf. To navigate to e.g. a product, the four coordinates can be used to determine the fastest and shortest route and the coordinates can be used to avoid collision with obstacles. Another possibility is that the coordinates are pre-programmed or can be downloaded from a site. Also the shelves can be equipped with scanners that scan the products and send this information to a processing device P. This information can be for example, amount of products, expiry date, etc. A display screen and a transceiver (transmitter and receiver) attached to a shelf can be used to give information about the products in the shelves and can be connected with a positioning device. The information can be for example product name, price, etc. This information can be changed through communication with the processing device P. Shoppers can for example download an application from the website of the organisation that gives the shopper the possibility to navigate in a building. Because each shopper has its own identification number that corresponds to personal information about the user, the system can distinguish the shoppers from each other. A mobile phone, discount pass, shopping cart and basket for example with positioning software, a built-in positioning device or a RFID-tag are examples that can be used to examine a shopper's behaviour in a store. A bracelet with for example a positioning device can also be used to see if a shopper reaches out to a product. Also a system, sensor or method that has the ability to measure external stimuli or sensory input like sights, sounds, smells, tastes, textures etc. from a person, animal or object can be used in combination with the positioning system.

Companies want their products to be visible in a store. Because there are a lot of products in a shelf, it is difficult for a manufacturer to let their products stand out. For example a smartphone or a positioning device that e.g. communicates with internet or a processing device P can make on spot advertising for a product. If a shopper walks in a certain area the system can give the shopper an advertisement of a product and also can give the possibility to navigate directly to the product. This can motivate a shopper to purchase a product that he/she did not intend to buy. Also, the system can do on-site interviews with the shopper. If the shopper stands for example for a shelf, the system can send the shopper an interview containing for example questions about the shelf or products. Also, screens in the store that can scan the position, ID-code and shopping history of the shopper or can communicate with a processing device P, can provide a specific advertisement related to the shopper. For example, if the shopper is in the area of the screen, a specific advertisement can be shown related to the shoppers shopping history, e.g. if a shopper buys a lot of soft drinks, the screen can show a commercial of a soft drink. Also, group advertisement can be used. If the majority of the group buys a lot of snacks, the system can show a commercial of a snack or give a promotional action that is targeted on the group. The promotional actions and advertisements can also be broadcast by the announcement system of e.g. a shopping mall, a store etc. or can be combined with the screens. With this system it is possible to do national, regional or local targeting in a store, target a single shopper or a group.

FIG. 15 shows an example of a table/computer program that can be used to collect and store data and to analyse people. A consumer identification number (ID-number shopper) 50 is sent by a positioning device that communicates with a processing device that could be connected with a socio-demographic database. The information that is contained in this database could be for example gender, age, origin, religion, income, interest, shopping history, allergic information etc. A store identification code (ID-number store) 51 can be sent by a positioning device in the store that holds the stores name, location of the store, address etc. Date 52 registers the date when a consumer enters the research area. A visiting-rate 53 checks how many times the consumers identification number is registered in the store by day, week, month etc. This can also be used to determine the number of visitors within a certain time slot within a certain area or sub-area. Time of arrival 54 and time of departure 57 are activated when a person comes in the building or research area and when a person leaves the building or research area equipped with a positioning device. Time spent in zones 55 locates the position of a person with a positioning device and keeps the time how long a person spends in a specific area/zone. For example zone 0 can be fresh product, zone 1 meat products etc. and the products can also be categorized in sub-categories, for example water, carbonated soft drinks, still drinks and juices are stored in a shelf and also they can be categorized by product brands. Time spent at check-out point 56 is registered when a person stands in the area that is connected with the check-out point. The system registers when a person's coordinates are in the area of the check-out point and starts a timer to register the time that the person spends at a check-out point. Total time of visit 58 is the total time spent in the research area. Position data (walking-routes) in zones 59 is used when a positioning device sends its coordinates to a processing device P. The processing device stores the received coordinates and can follow the walking routes real-time or the stored information can be accessed afterwards to be used for data analysis. Also the walking-routes that are recorded of each positioning device can be replayed afterwards by the system. By viewing direction 60 a positioning device may use a gyroscope or a compass sensor to analyse a persons viewing direction. With this information, an organisation can determine for example the best location for advertisement and displays, and determine its value by counting the number of visitors within an area and/or the number of views to a specific area. This can also be enhanced by linking these key performance indicators with time e.g. when someone looks at an advertisement this can be registered as one view and/or the time the person spends looking at it, e.g. 10 seconds. The confrontation moments can be measured with the walking-routes and viewing direction to determine the location and direction the shopper passes and looks the most. Speed and weight measurements in zones 61 may be registered when the positioning device uses an accelerometer to measure the speed of a person. The system can calculate how fast or slow a person is moving. Also switching from coordinates can be used to calculate how fast or slow a person is moving. Weight measurements measure the weight of a shopping cart or basket to see when a person puts a product in the shopping cart or basket. Also the shopping cart or basket can be equipped with a scanning device that scans the products that the person puts in the cart or basket. This scanning device is connected with a positioning device and a processing device P. By read in bought products by check-out point 62 the check-out point is connected with a processing device P. The processing device P stores the read in products from the check-out point in a database. With this stored information there can be specific promotional actions for the shopper, since the buying habits from the shopper can be analysed by the system. Transaction amount 63 is the amount that is spent at the check-out point. Total consumers/shoppers at a point in time 64 scans all the positioning devices that are in the research area at a point in time. The system can store and update the information real-time or with a time delay to lower the energy consumption of the devices and save storage space. Rules can be applied to the system, for example when a event is recorded e.g. someone visits a store but forgets something outside and therefore leaves the store directly and within a short time enters the store again. In this example it is not preferred that the system records this as two shopping trips but just as one. Another rule that can be applied to the system, for example the system can calculate a average speed of a shopper and based on rules when the speed changes outside a certain bandwidth, this means a shopper is engaged by a certain stimuli.

Figure 13A:
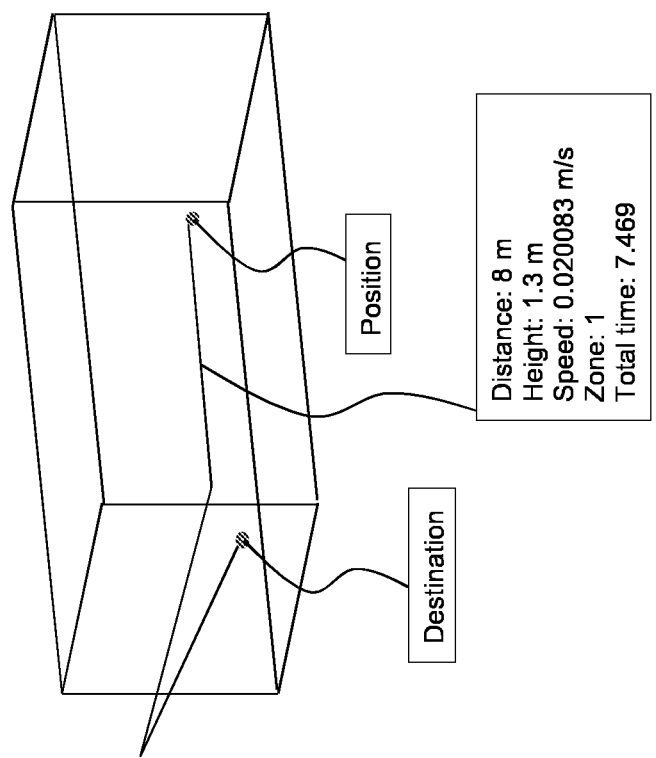
FIG. 13a visualizes a navigation process in a zone.
Figure 13B:
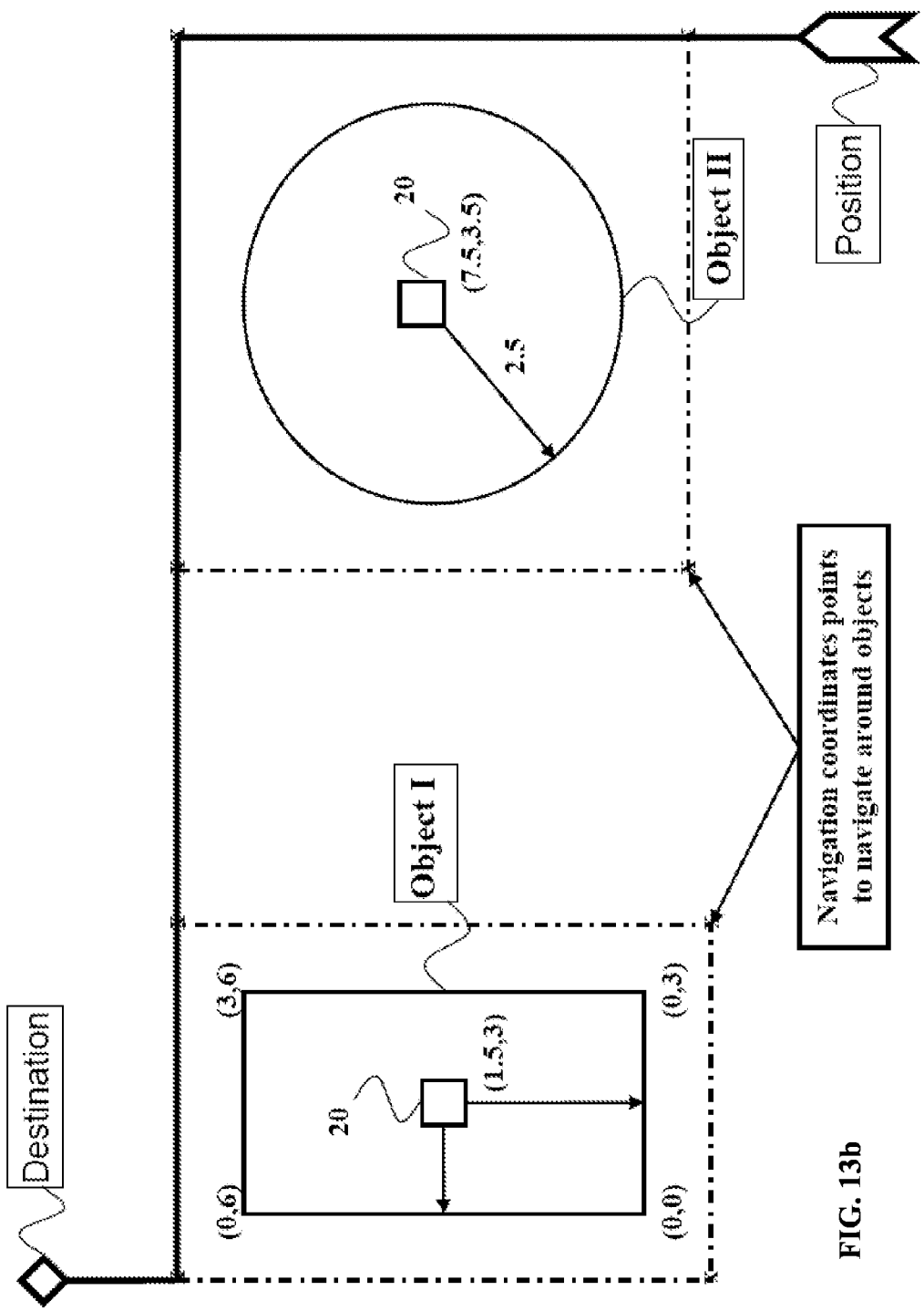
FIG. 13b visualizes a navigation process assisted with navigation coordinates and further illustrates objects wherein a positioning device is placed.

FIG. 13a illustrates an example of a visualization of a part of the table of FIG. 15 and a navigation screen. The graphics are an example how a three-dimensional or two-dimensional navigation system can be configured for shoppers or other purposes. If the system is three-dimensional or suggests three dimensions, the user can see how high or low an object is located. The shopper can see the exact location of a product or object. A two-dimensional system can indicate the location where the products are stocked on a shelf by speech or as a written text. The location of the products can be pre-programmed or collected by a positioning device. Also, a distance between a product and the shopper can be given, the shopper can input a shopping list in the positioning device at home and the system can calculate the estimated time how long it takes to get all the products, the system can show the fastest walking route, the shopper can see how many products are bought, how much money there is spent on products, the system can keep a history, and the system can give advice or suggestions e.g. when it is necessary to buy a new product or when the product expires. The system can give suggestions what the consumer might like, based on his/her shopping history and compare that to shoppers with comparable purchases, and identify which products are also bought by corresponding shoppers and have not been bought by the respective shopper. The positioning device can also be connected to the Internet where the system can see the offers and where the offers are positioned in a store. Also the system can give a warning signal when a shopper passes an offer or give information on a screen about the offer or products. Also the system can check if products have ingredients that the shopper is allergic to. The graphic shows the time of arrival and the time of departure of the shopper. The shopper and company can see how fast the shopper is moving. The company can see how much time a consumer is spending in a zone and the overall time the shopper has spent in the store. The system can determine an average value by the information that is collected by sensors, positioning devices and/or processing devices and it is also possible to determine e.g. a prospect with the collected information. These collected values can give for example the estimated time when a positioning device will arrive at a destination determined by the average speed a positioning device is moving.

Also the system can give for example a reference point of the position of a user and from that point the user with a positioning device can follow the pre-programmed walking routes that are assisted by sensors, for example a gyroscope and a accelerometer. The system can update once in a while the position to the positioning device to check whether the position corresponds to the real position of the user. If the user takes another route than the pre-programmed route the positioning device sends a request to receive positioning signals. The positioning device can then update the position of the user frequently or real-time until the user follows his pre-programmed route again or until the positioning device has calculated a new route. This method consumes less power consumption of the positioning device. The pre-programmed walking routes and shopping list can be sent on arrival in a store to the processing device P, through the internet or other means of communication.

To manage the employees of an organisation, the system can also be used as an employee management system. The system can track the employees when they check in and out, walking routes, working hours etc. The system can track the time how long an employee spends in an area and how many employees are working on e.g. a project. The system can analyse activities over time and is therefore capable to predict how much capacity is needed at a certain point of time or period. For example if there are long waiting lines every Saturday between 11.00 AM-13:00 PM at the check-out point, the system can give information to e.g. the manager to adjust the number of employees to reduce the waiting lines. Also it can be used as a security measure to track visitors or employees to prevent them from going into a restricted area. This system can improve productivity, efficiency and security in an organisation and administer, supervise and manage employees. The above mentioned systems can also be combined with each other.

A system according to the present invention may be coupled to a mobile communication device (such as a cellular phone, smartphone, tablet pc or personal digital assistant) to show a position of at least one first or second positioning device on a display (such as output device 27, FIG. 1) displaying a plan or map, similar to circumstance (b) or (e) shown in, and explained by reference to FIGS. 5 and 6, respectively, wherein the processing device P may be the mobile communication device, and wherein data transmission to the processing device P takes place through a wireless radio network, for example through the Internet.

Other applications of the present invention include:
- a visual display unit to be worn by a user, wherein different pictures generated by a computer system can be projected to be seen by the user depending on the position of the user and the orientation of the visual display unit. The visual display unit may be provided with at least one first of second positioning device. Application for example in science, marketing, display of movies, and gaming industry;
- recognition of traffic signs or local traffic regulations, where, based on a distance or position of a traffic party having a object comprising at least one first or second positioning device, an indication or warning of a specific traffic situation may be provided to the traffic party;
- recognition of joystick or controller distance, position or orientation, where the controller comprises at least one first or second positioning device. Application for example in the gaming industry;
- positioning of robots, wherein robots may navigate based on information obtained by at least one first or second positioning device comprised in, or connected or coupled to the robot;
- pointing devices, wherein a distance, position and orientation of a pointing device may be determined to remotely manipulate a software object, such as a button, key, graphic object, keyboard, etc.;
- finding objects, including persons and animals, provided with at least one first or second positioning device. Applications include for example finding a car in a car park, finding a missing person or animal, finding a friend in a public or private area, such as in a canteen, company or school, or finding a seat in a theater or cinema;
- navigating, wherein a position of an object is determined through at least one first or second positioning device, and this position is projected on a map to enable a person or device to navigate in the area represented by the map;
- alarm systems, wherein a displacement of an object comprising, or connected or coupled to, at least one first or second positioning device can be detected and acted upon;
- sports and games, wherein a position (and speed, and acceleration, and direction) of an object, person or animal may be determined;
- social networks for e.g. companies, schools, universities, to find colleagues, students, classmates in a building or elsewhere. In this case, the system may be coupled to a server configured to represent a position or location on a website. In an embodiment, the position may be transmitted through a mobile device. In an embodiment, the position(s) are represented continuously, but a selection may be made to first receive a message from a person within the social network to request permission to see the position before it is represented. If the person is in the building, a navigation to the persons position may be made available;
- determination of position of body parts (hands, feet, arms and legs) to provide a three dimensional animation or research to movements of people, animals and/or objects. For every body part, a positioning device should be provided and attached to it;
- automatic lighting and climate control in a building, taking into consideration the position of the person(s) in a building. The light intensity or other aspects of the light, such as the color thereof, may be automatically determined to suit the needs of the person(s). In some embodiments, a user may indicate the desired lighting conditions, and the system then may determine the best lighting conditions in each situation. Also, heating and other climate conditions may be set in accordance with a position of a person. If there are no persons in a room, the lighting, heating, air conditioning, etc. may be switched off automatically;
- activating mobile devices in case of emergencies or disasters, where a positioning device of the mobile device may be activated by public services to find a missing person. The user of the mobile device may also activate the positioning device himself/herself, by a predetermined user input, or by calling an emergency telephone number;

connecting objects, by checking whether the objects are in a correct position, and measuring the distance of the objects before bringing them into contact with each other. Applications include connecting cars of a train, or trains, connecting one aircraft to another aircraft when fueling, etc.;

virtual guide for visitors of a museum, an amusement park, etc.

The system and method explained above can be used in combination with other methods and calculations to determine the position or in combination with other navigation or positioning systems. Also to increase security the signals can be encrypted with encryption codes.

As explained above, in a method and system of the present invention, a distance between at least one first positioning device, FPD, and an second positioning device, SPD, is determined. At the FPD, a plurality of positioning signals are broadcast, wherein each positioning signal has a predetermined different broadcast power. At the FPD, a plurality of distance indication data signals is broadcast. Each distance indication data signal carries predetermined distance indication data associated with a distance range of a corresponding positioning signal at the predetermined broadcast power. At the SPD, the distance indication data are extracted from each distance indication data signal corresponding to a received positioning signal. At the SPD, a distance between the FPD and the SPD is determined from the distance indication data indicating the smallest distance range among the distance indication data received from the FPD.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/ dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of determining a distance between at least one first positioning device, FPD, and a second positioning device, SPD, the method comprising:

at the FPD, broadcasting a plurality of positioning signals, each positioning signal having a predetermined different broadcast power;

at the FPD, broadcasting a plurality of distance indication data signals, each distance indication data signal carrying predetermined distance indication data associated with a distance range of a corresponding positioning signal at the predetermined broadcast power; and at the SPD, extracting the distance indication data from each distance indication data signal corresponding to a received positioning signal, and determining a distance between the FPD and the SPD from the distance indication data indicating the smallest distance range among the distance indication data received from the FPD, at a determination of the distance between the FPD and the SPD, storing the distance indication data indicating a smallest distance range in the SPD; and at a subsequent determination of the distance between the FPD and the SPD, comparing the distance indication data indicating the smallest distance range with distance indication data indicating a smallest distance range previously stored in the SPD to determine if the distance indication data indicating the smallest distance range differs or does not differ from distance indication data indicating a smallest distance range previously stored in the SPD, wherein:

if the distance indication data indicating the smallest distance range of the subsequent determination differs from the distance indication data indicating the smallest distance range previously stored, then determining the distance from the distance indication data indicating a smallest distance range of the subsequent determination; and if the distance indication data indicating the smallest distance range of the subsequent determination does not differ from the distance indication data indicating the smallest distance range previously stored, then determining the distance from an average of a distance range associated with the distance indication data indicating the smallest distance range previously stored and a smaller distance range.

2. The method of claim 1, wherein the SPD stores information on each distance range associated with the distance indication data.

3. The method of claim 1, wherein comparing the extracted distance indication data with previously stored distance indication data is performed during a predetermined time period and/or for a predetermined number of times.

4. The method of claim 1, further comprising:
determining a position, a direction, a speed, and/or an acceleration taking into account previously stored distance indication data and time.

5. The method of claim 1, wherein the positioning signal includes the distance indication data signal.

6. The method of claim 1, wherein the distance indication data have a value proportional to the associated broadcast power.

7. The method of claim 1, wherein the plurality of positioning signals having different broadcast power are broadcast sequentially, simultaneously or arbitrarily.

8. The method of claim 1, wherein the positioning signal is a radio signal, a light signal, a sound signal, or a magnetic field signal, and the broadcast power is a radio signal power, a light intensity, a sound power, or a magnetic field power or strength, respectively.

9. The method of claim 1, wherein the positioning signals and/or distance indication data signals are broadcasted real-time, or with time intervals, or on request.

10. The method of claim 1, wherein the SPD stores information on the broadcast distance corresponding to the distance indication data.

11. The method of claim 1, wherein determining the distance between the FPD and the SPD further comprises:
calculating or measuring a position of the SPD between different distance ranges using a sensing device or a sensor, the sensor comprising an accelerometer, a compass sensor and/or a gyroscope.

12. The method of claim 1, wherein the FPD switches antennas and/or switches to different kind of antennas such that the distance range of a positioning signal increases according to a linear function in accordance with a linear increase in broadcast power.

13. The method of claim 1 for determining a distance between each one of a plurality of FPDs and an SPD, the method comprising:
at each FPD, broadcasting a plurality of positioning signals, each positioning signal having a predetermined different broadcast power;
at each FPD, broadcasting a plurality of distance indication data signals, each distance indication data signal carrying predetermined identification data identifying the FPD, and further carrying predetermined distance indication data associated with a distance range of a corresponding positioning signal at the predetermined broadcast power, wherein the positioning signals and/or distance indication data signals further carry position data associated with each FPD position;
at the SPD, extracting the identification data and distance indication data from each distance indication data signal corresponding to a received positioning signal, and further extracting the position data from each received positioning signal and/or distance indication data signal to determine each FPD position, and determining a distance between each FPD as identified by its identification data and the SPD from the distance indication data indicating the smallest distance range among the distance indication data received from the respective FPD, and
at the SPD, calculating the SPD position from said FPD positions and said distances between the FPDs and the SPD, and sending the position to an output device.

14. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 1.

15. The method of claim 1, wherein a position and/or distance can be determined if a positioning device receives a positioning signal and/or distance indication data signal and/or receives different positioning signals and/or distance indication data signals within a certain period.

16. The method of claim 1, wherein the positioning signal and/or the distance indication data signal is a modulated signal.

17. The method of claim 1, wherein at least one of the plurality of positioning signals and the plurality of distance indication data signals that are broadcast further carries information and/or identification data that refers to stored information.

18. The method of claim 1, wherein the FPD and/or the SPD communicates and processes data comprising position data, distance data, distance value, identification data, sensor data, distance indication codes and/or other information to and/or from another first positioning device, another second positioning device, server and/or a processing device.

19. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 2.

20. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 3.

21. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 15.

22. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 4.

23. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 5.

24. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 16.

25. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 6.

26. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 7.

27. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 8.

28. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 9.

29. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 10.

30. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 17.

31. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 11.

32. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 12.

33. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 18.

34. A computer program product comprising a computer readable non-transitory data carrier comprising first computer instructions which, when loaded in each processor of the plurality of FPDs, and second computer instructions, which when loaded in a processor of the SPD, cause the processors to carry out the method steps of claim 13.

35. The method of claim 1, wherein the distance indication data is a Distance Indication Code.

36. A computer program product comprising a computer readable non-transitory data carrier comprising first computer instructions which, when loaded in a processor of the first positioning device, FPD, and second computer instructions, which when loaded in a processor of the second positioning device, SPD, cause the processors to carry out the method steps of claim 35.

37. A system of determining a distance between at least one first positioning device, FPD, and a second positioning device, SPD, wherein:
the FPD is configured to broadcast a plurality of positioning signals, each positioning signal having a predetermined different broadcast power;
the FPD is further configured to broadcast a plurality of distance indication data signals, each distance indication data signal carrying predetermined distance indication data associated with a distance range of a corresponding positioning signal at the predetermined broadcast power; and
the SPD is configured to:
receive the distance indication data signals,
extract the distance indication data from each distance indication data signal corresponding to a received positioning signal,
determine a distance between the FPD and the SPD from the distance indication data indicating the smallest distance range among the distance indication data received from the FPD,
at a determination of the distance between the FPD and the SPD, store the distance indication data indicating a smallest distance range in a memory; and
at a subsequent determination of the distance between the FPD and the SPD, comparing the distance indication data indicating the smallest distance range with distance indication data indicating a smallest distance range previously stored in the SPD to determine if the distance indication data indicating the smallest distance range differs or does not differ from distance indication data indicating a smallest distance range previously stored in the SPD, wherein:
if the distance indication data indicating the smallest distance range of the subsequent determination differs from the distance indication data indicating the smallest distance range previously stored, then determining the distance from the distance indication data indicating a smallest distance range of the subsequent determination; and
if the distance indication data indicating the smallest distance range of the subsequent determination does not differ from the distance indication data indicating the smallest distance range previously stored, then determining the distance from an average of a distance range associated with the distance indication data indicating the smallest distance range previously stored and a smaller distance range.

38. The system of claim 37 for determining a distance between each one of a plurality of FPDs and a SPD, wherein:
the FPD is configured to broadcast a plurality of positioning signals, each positioning signal having a predetermined different broadcast power;
the FPD further is configured to broadcast a plurality of distance indication data signals, each distance indication data signal carrying predetermined identification data identifying the FPD, and further carrying predetermined distance indication data associated with a distance range of a corresponding positioning signal at the predetermined broadcast power, wherein the positioning signals and/or distance indication data signals further carry position data associated with each FPD position; and
the SPD is configured to extract the identification data and distance indication data from each distance indication data signal corresponding to a received positioning signal, and further to extract the position data from each received positioning signal and/or distance indication data signal to determine each FPD position, and to determine a distance between each FPD as identified by its identification data and the SPD from the distance indication data indicating the smallest distance range among the distance indication data received from the respective FPD, and the SPD is configured to calculate the SPD position from said FPD positions and said distances between the FPDs and the SPD, and to send the position to an output device.

39. The system of claim 37, wherein the SPD stores information on each distance range associated with the distance indication data.

40. The system of claim 37, wherein at least one of the positioning devices comprises a sensing device or a sensor, the sensor comprising an acceleration sensor, a compass sensor and/or a gyroscope.

41. The system of claim 37, wherein at least one of the positioning devices comprises a switch controlled by a controller to switch antennas and/or switching to a different kind of antenna.

42. The system of claim 37, wherein the FPD and/or the SPD is configured to communicate data to and/or from a processing device.

43. The system of claim 38, wherein the SPD stores information on each distance range associated with the distance indication data.

44. The system of claim 38, wherein at least one of the positioning devices comprises a sensing device or a sensor, the sensor comprising an acceleration sensor, a compass sensor and/or a gyroscope.

45. The system of claim 38, wherein at least one of the positioning devices comprises a switch controlled by a controller to switch antennas and/or switching to a different kind of antenna.

46. The system of claim 38, wherein the plurality of FPDs and/or the SPD is configured to communicate data to and/or from a processing device.

47. The system of claim 37, wherein the FPD, the SPD and/or the processing device stores information on each Distance Indication Code.

48. The system of claim 38, wherein the plurality of FPDs, the SPD and/or the processing device stores information on each Distance Indication Code.

* * * * *